(12) United States Patent
Yamanaka et al.

(10) Patent No.: US 8,933,328 B2
(45) Date of Patent: Jan. 13, 2015

(54) DYE-SENSITIZED SOLAR CELL MODULE AND METHOD OF PRODUCING THE SAME

(75) Inventors: Ryohsuke Yamanaka, Gojyo (JP); Nobuhiro Fuke, Nara (JP); Atsushi Fukui, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1102 days.

(21) Appl. No.: 12/307,625

(22) PCT Filed: Jul. 3, 2007

(86) PCT No.: PCT/JP2007/063309
§ 371 (c)(1),
(2), (4) Date: Oct. 5, 2009

(87) PCT Pub. No.: WO2008/004553
PCT Pub. Date: Jan. 10, 2008

(65) Prior Publication Data
US 2010/0071743 A1    Mar. 25, 2010

(30) Foreign Application Priority Data
Jul. 6, 2006 (JP) .................. 2006-187026

(51) Int. Cl.
*H01G 9/20* (2006.01)
(52) U.S. Cl.
CPC ........... *H01G 9/2081* (2013.01); *H01G 9/2059* (2013.01); *H01G 9/2031* (2013.01); *Y02E 10/542* (2013.01)
USPC .......................................... 136/263; 136/244
(58) Field of Classification Search
CPC ........................................ H01G 9/2027–9/204
See application file for complete search history.

(56) References Cited

U.S. PATENT DOCUMENTS 6,652,904 B1 * 11/2003 Phani et al. ..................... 427/74
2003/0230337 A1 * 12/2003 Gaudiana et al. ............. 136/256
(Continued)

FOREIGN PATENT DOCUMENTS

JP         2664194      6/1997
JP      2001-357897    12/2001
(Continued)

OTHER PUBLICATIONS

U.S. Appl. No. 12/307,643, filed Jan. 6, 2009, entitled "Dye-Sensitized Solar Cell Module and Method for Manufacturing the Same".
(Continued)

*Primary Examiner* — Jennifer Michener
*Assistant Examiner* — Christopher Danicic
(74) *Attorney, Agent, or Firm* — Nixon & Vanderhye, P.C.

(57) ABSTRACT

A dye-sensitized solar cell module comprising: a plurality of electrically series-connected solar cells having a first conductive layer formed on an insulating substrate; a photoelectric conversion device formed on the first conductive layer; and a second conductive layer formed on the photoelectric conversion device, wherein the photoelectric conversion device has a photoelectric conversion layer having a porous semiconductor layer adsorbing a dye, a carrier transporting layer and a catalyst layer and the dye-sensitized solar cell module is characterized in that the second conductive layer of the above-described one solar cell contacts the first conductive layer of an adjacent another solar cell and the photoelectric conversion device of the above-described adjacent another solar cell contacts the second conductive layer of the above-described one solar cell.

8 Claims, 19 Drawing Sheets

(56) References Cited

U.S. PATENT DOCUMENTS

| | | | |
|---|---|---|---|
| 2006/0243587 A1* | 11/2006 | Tulloch et al. | 204/242 |
| 2007/0079869 A1* | 4/2007 | Yukinobu | 136/263 |
| 2007/0089784 A1* | 4/2007 | Noh et al. | 136/263 |
| 2008/0202585 A1* | 8/2008 | Yamanaka et al. | 136/263 |
| 2008/0295880 A1* | 12/2008 | Skryabin et al. | 136/244 |

FOREIGN PATENT DOCUMENTS

| | | | | |
|---|---|---|---|---|
| JP | 2002-540559 | | 11/2002 | |
| JP | 2004/319383 | | 11/2004 | |
| JP | 2005-093252 | | 4/2005 | |
| JP | 2005-174679 | | 6/2005 | |
| JP | 2005-285781 | | 10/2005 | |
| JP | 2006-032110 | | 2/2006 | |
| JP | 2006-100025 A | | 4/2006 | |
| JP | 2006-107885 A | | 4/2006 | |
| JP | 2006-134870 A | | 5/2006 | |
| JP | 2006-164697 A | | 6/2006 | |
| WO | 97/16838 | | 5/1997 | |
| WO | 00/57441 | | 9/2000 | |
| WO | WO 2005/041217 | * | 5/2005 | H01B 5/14 |
| WO | WO 2005/069424 | * | 7/2005 | H01M 14/00 |
| WO | WO2006/015431 | * | 2/2006 | H01M 14/00 |

OTHER PUBLICATIONS

International Search Report for PCT/JP2007/063318, mailed Sep. 25, 2007.

International Search Report for PCT/JP2007/063309, mailed Sep. 25, 2007.

* cited by examiner

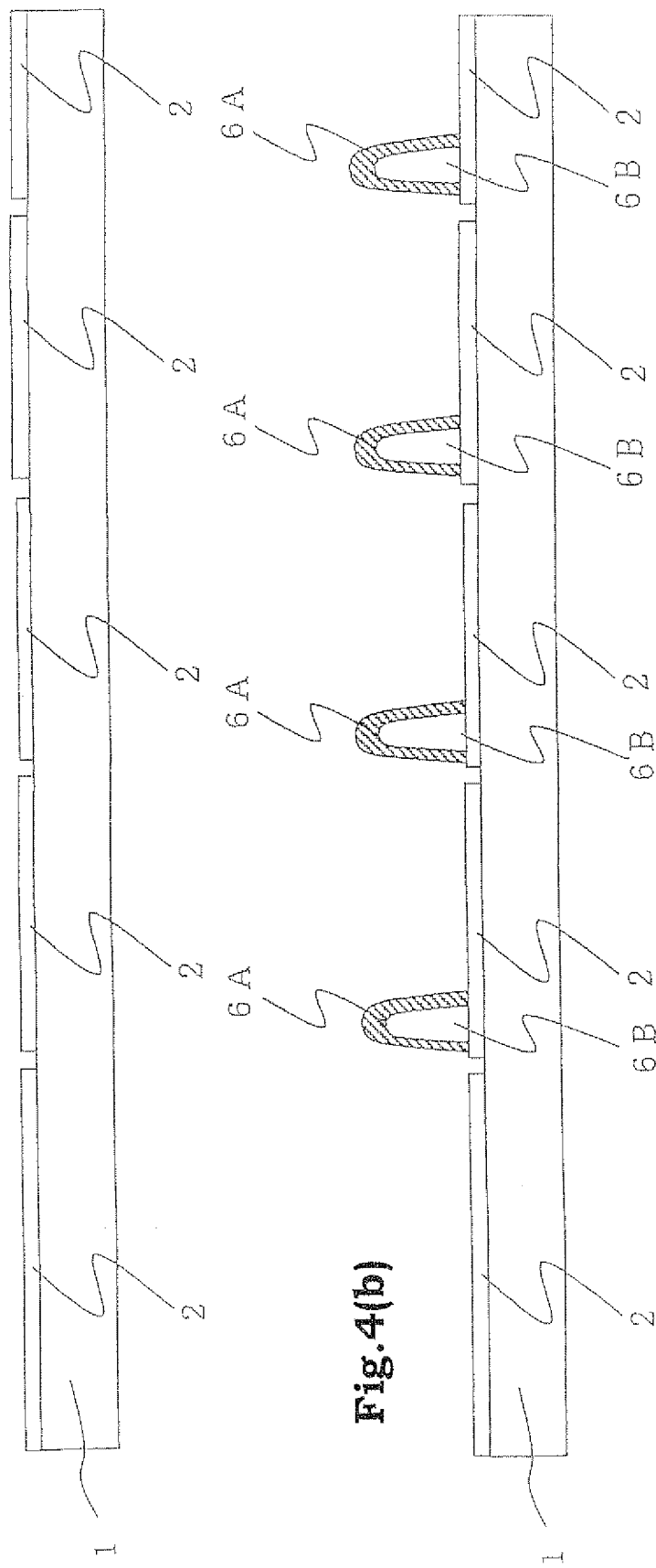

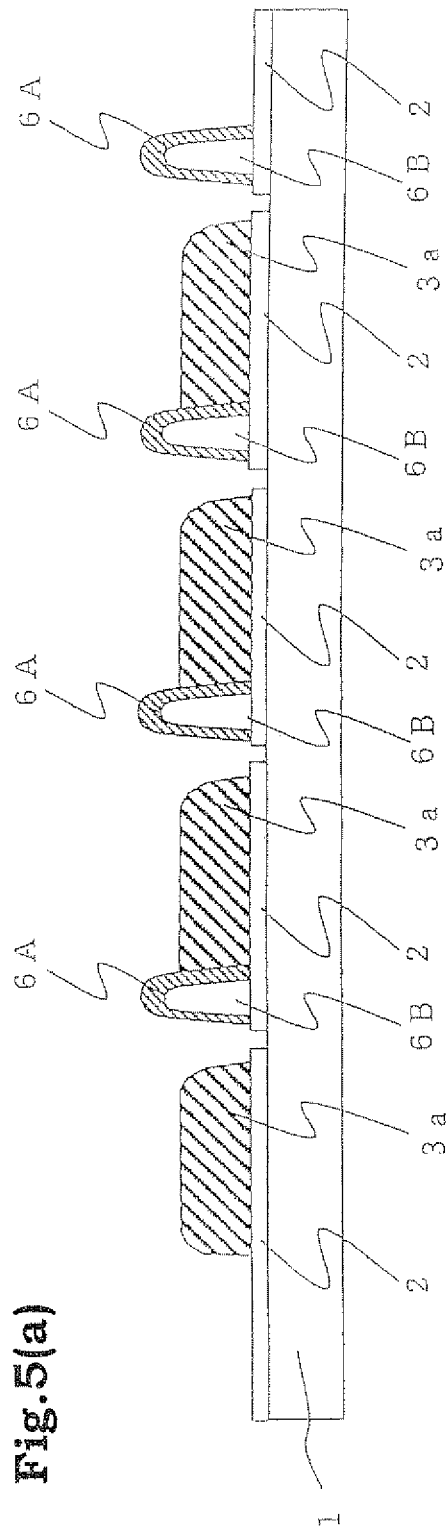
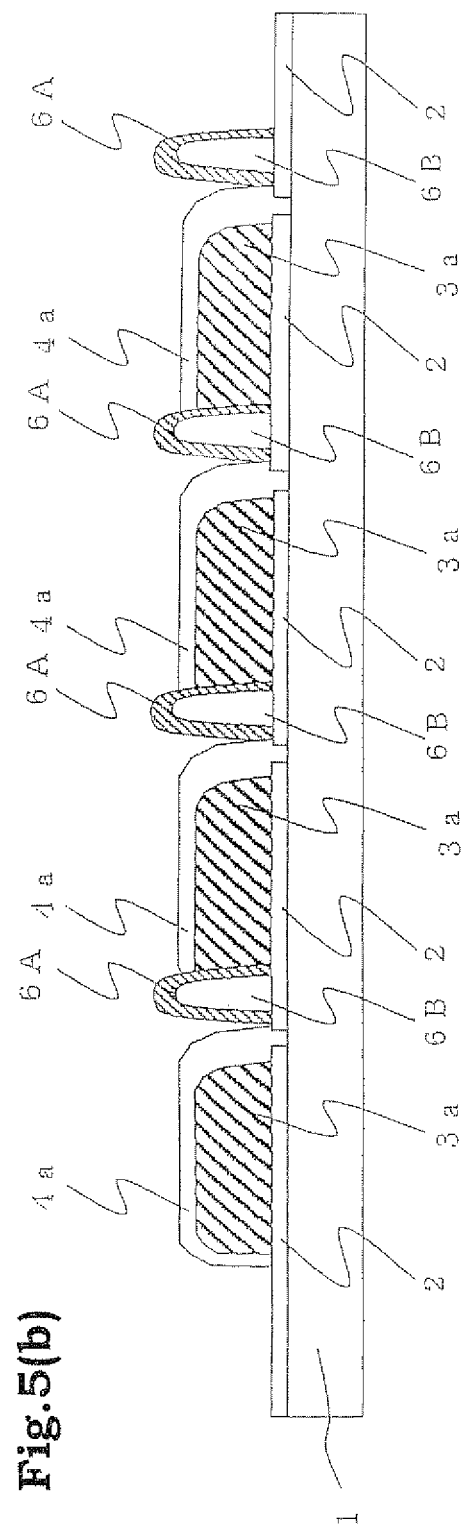
Fig.5(a)
Fig.5(b)

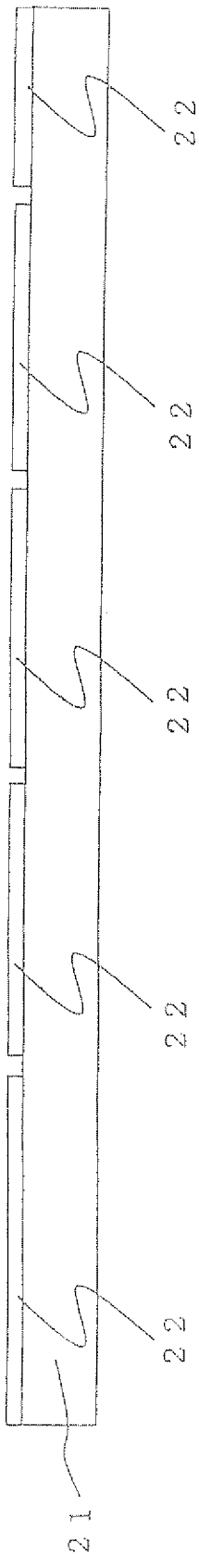
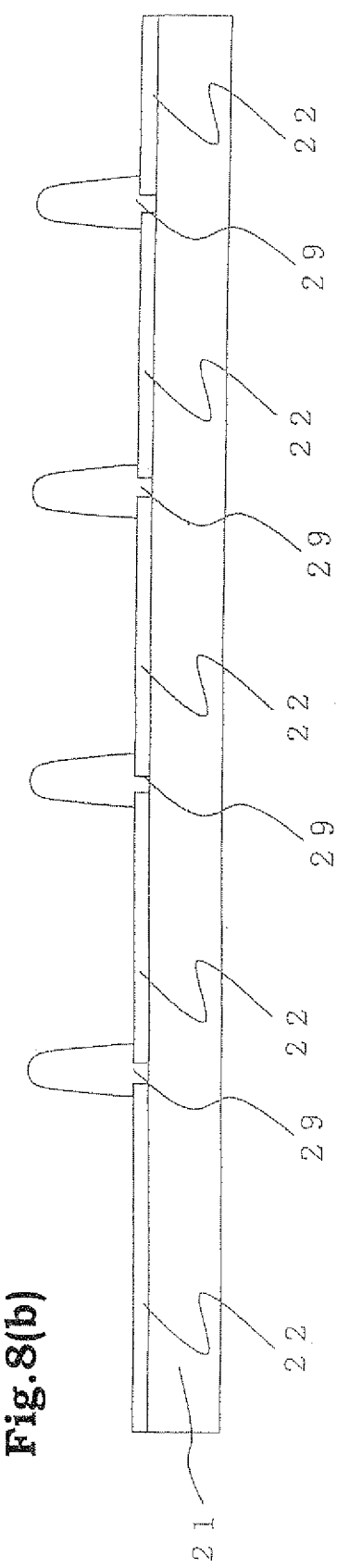
Fig.8(a)
Fig.8(b)

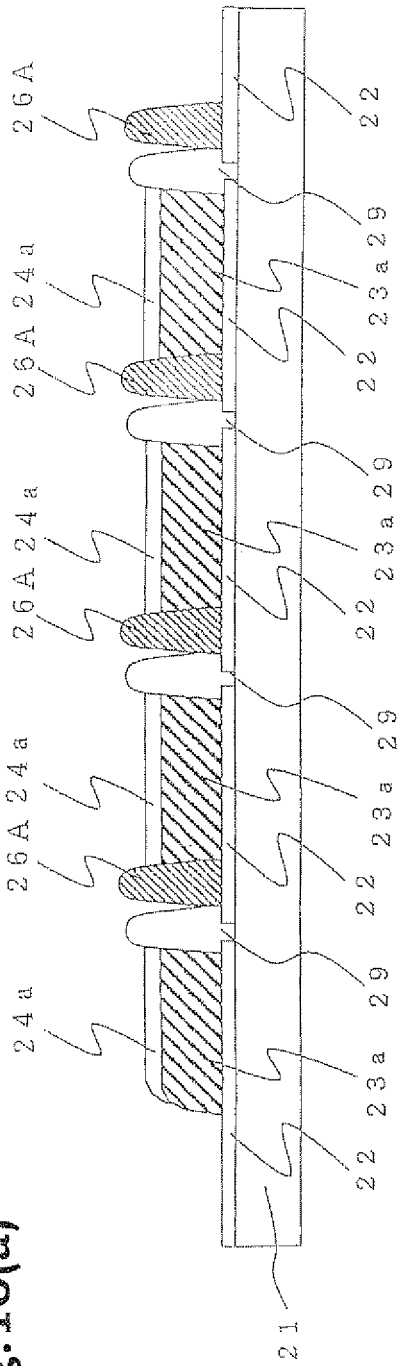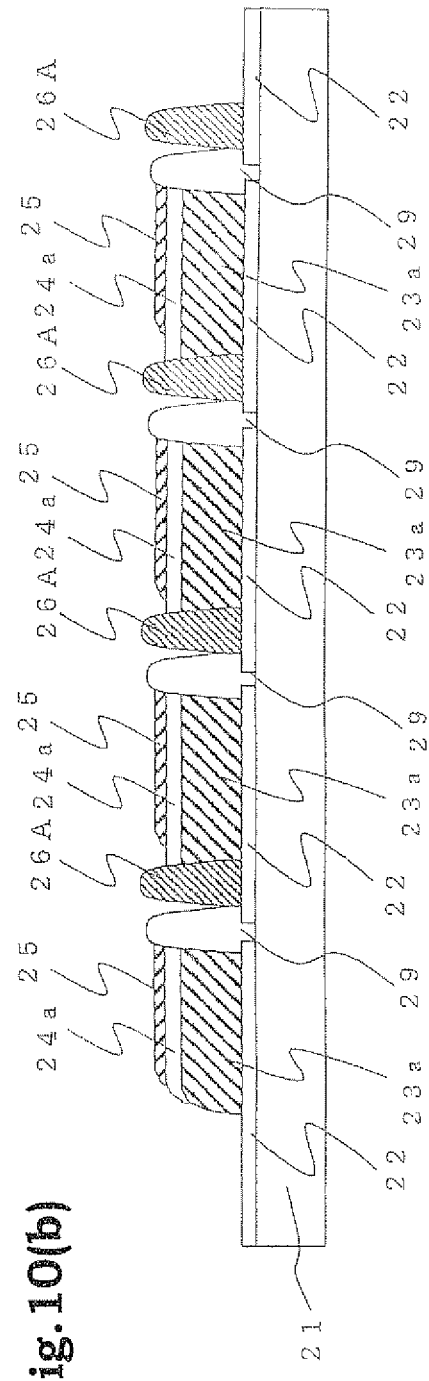

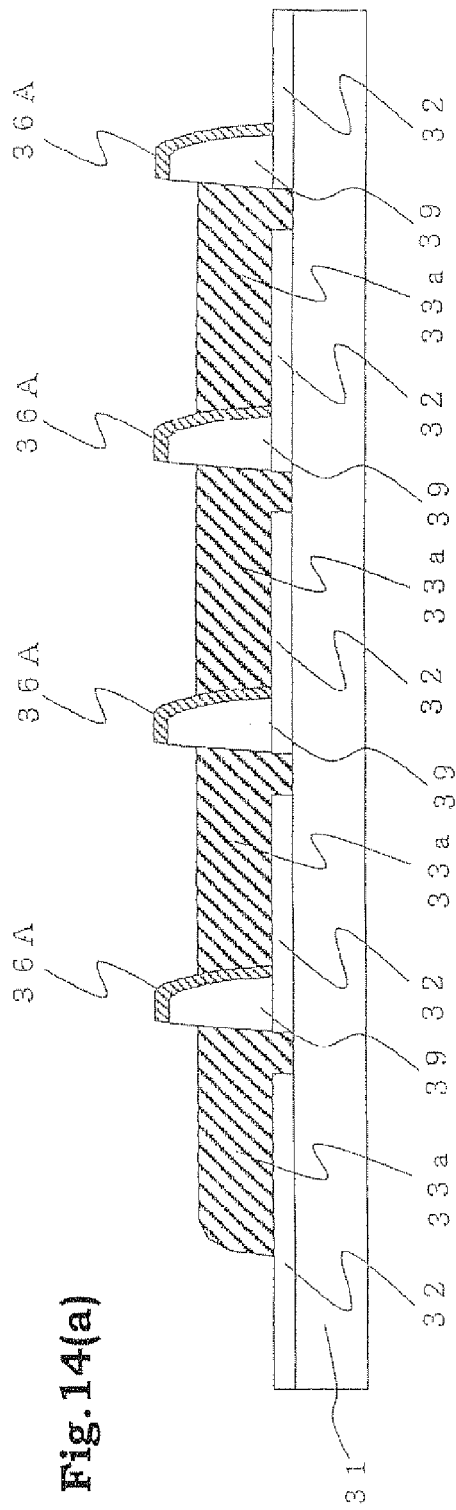

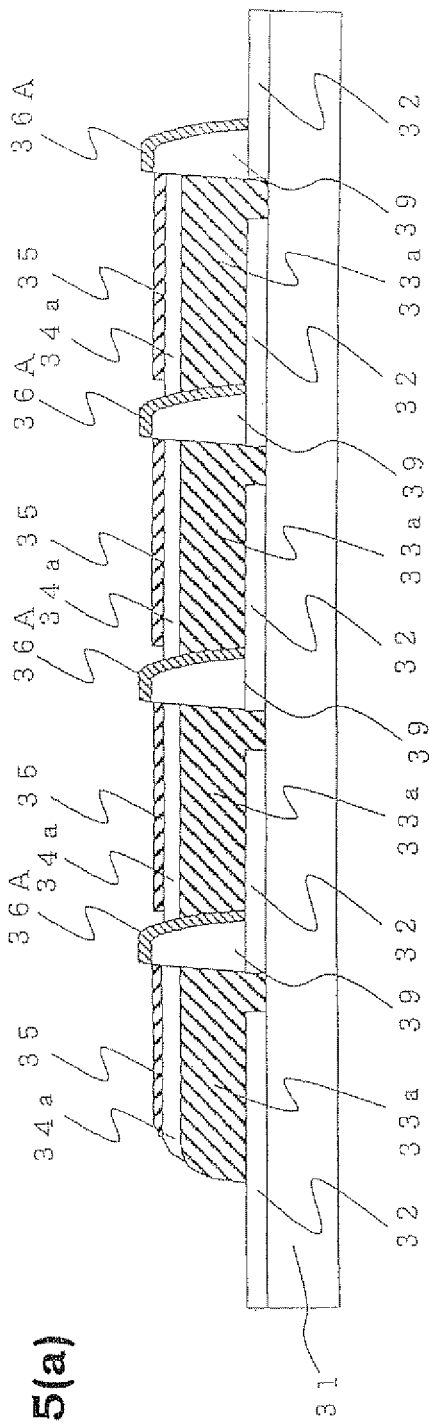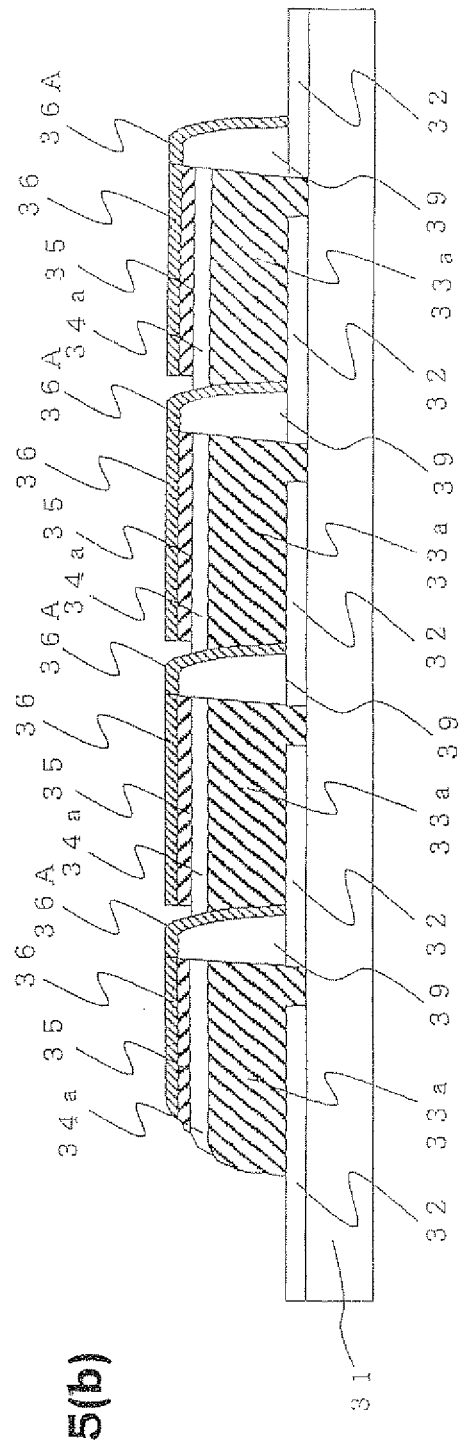

DYE-SENSITIZED SOLAR CELL MODULE AND METHOD OF PRODUCING THE SAME

This application is the U.S. national phase of International Application No. PCT/JP2007/063309, filed 3 Jul. 2007 which designated the U.S. and claims priority to Japanese Application No. 2006-187026, filed 6 Jul. 2006, the entire contents of each of which are hereby incorporated by reference.

TECHNICAL FIELD

The present invention relates to a dye-sensitized solar cell module and a method of producing the same.

BACKGROUND ART

As an alternative energy source to fossil fuel, solar cells capable of converting sun light to electric power have drawn attention. At present, some of solar cells using crystalline silicon substrates and thin film silicon solar cells have started to be used practically. However, the former has a problem of a high production cost of the silicon substrates and the latter has a problem that the production cost is increased since various kinds of gases for semiconductor production and complicated production facilities are required. Therefore, in both solar cells, it has been tried to lower the cost per electric power output by increasing the efficiency of photoelectric conversion; however, the above-mentioned problems still remain while being unsolved.

As a new type solar cell, there has been proposed a wet type solar cell based on photo-induced electron transfer of a metal complex (see Patent Document 1). As shown in FIG. 18, this wet type solar cell is composed by laminating a photoelectric conversion layer 104 which is a metal oxide semiconductor layer adsorbing a dye, a carrier transporting layer (electrolyte solution) 107 and a catalyst layer 105 in a region surrounded by conductive films (electrode) 102, 106 respectively formed on two glass substrates 100, 101 and sealing layers 103, 103 formed therebetween, and has an absorption spectrum in a visible light region (Conventional Technology 1).

When the wet type solar cell is irradiated with light, electrons are generated in the photoelectric conversion layer 104, the generated electrons transfer to another conductive film 105 and the catalyst layer 105 through the conductive film 102 on a light-receiving plane side and an external electric circuit, and the transferred electrons are further conveyed and turn back to the photoelectric conversion layer 104 owing to the ion in the electrolyte of the carrier transporting layer 107. Electric energy is outputted based on such the series of the flow of the electrons.

However, since a basic structure of the dye-sensitized solar cell described in Patent Document 1 is a structure that the electrolytic solution is injected between the opposed glass substrates with the conductive film. Therefore, it is possible to produce a trial solar cell with a small surface area, but it is difficult to apply this solar cell to a solar cell with a large surface area such as 1 m square. That is, if in such a solar cell, the surface area of one photoelectric conversion device is enlarged, the generated current is increased proportional to the area. However, since a voltage drop in the plane direction of the conductive film to be used for the electrode parts is increased, and the internal series resistance of the solar cell is increased. As a result, a fill factor (FF) in a current-voltage characteristic and a short circuit current at the time of the photoelectric conversion are lowered, resulting in a problem of decrease of the photoelectric conversion efficiency. Further, since two glass substrates with a conductive film are used, the module has problems that the production cost in forming a module of a dye-sensitized solar cell is increased and the weight is increased.

In order to solve the problems on an internal series resistance, there has been proposed a dye-sensitized solar cell module having a plurality of photoelectric conversion devices connected in series in Patent Document 2. In the dye-sensitized solar cell module in Patent Document 2, as shown in FIG. 19, a plurality of photoelectric conversion devices are formed between a glass substrate 110 on which a transparent conductive film (electrode) 112 is formed in a comb-like shape by patterning and a glass substrate 111 on which a transparent conductive film (electrode) 116 and a catalyst layer 115 are formed successively in a comb-like shape by patterning, and a connecting conductive layer 118 interposed between a pair of insulating layers 113 is formed between the adjacent photoelectric conversion devices and this connecting conductive layer 118 electrically connects the upper transparent conductive film 116 and the lower transparent conductive film 112. The photoelectric conversion device is formed by laminating a photoelectric conversion layer 114, a carrier transporting layer 117, and the catalyst layer 115 in this order from the lower transparent conductive film 112 side (Conventional Technology 2).

However, in the dye-sensitized solar cell module proposed in Patent Document 2, since a dye-sensitized solar cell is prepared by pouring an electrolytic medium into between the glass substrates, the problems of cost and weight still remain while being unsolved.

In order to solve these problems, dye-sensitized solar cell modules having a structure in which number of glass substrates is reduced to one are proposed in Patent Documents 3 and 4.

The dye-sensitized solar cell module of Patent Document 3, as shown in FIG. 20, has a photoelectrode 1 having a plurality of transparent electrodes 15 formed discretely, and has a structure in which a dye-sensitized photoelectric conversion device, obtained by laminating a semiconductor layer 16, a dye and an electrolyte layer (electrolyte solution) 3, is formed on each transparent electrode 15, and an opposed electrode 2B contacting the adjacent transparent electrode 15 is formed on the electrolyte layer 3 so as to connect with a plurality of photoelectric conversion devices with each other in series, and the periphery of the respective photoelectric conversion devices is sealed with a cell sealing portion 4B made of a resin (Conventional Technology 3). In addition, in FIG. 20, a reference numeral 8 represents a base film.

Further, a dye-sensitized solar cell module in Patent Document 4, as shown in FIG. 21, has a transparent glass substrate 310 having a plurality of transparent conductive films 112 formed discretely, and has a structure in which a dye-sensitized photoelectric conversion device, obtained by laminating a porous titanium oxide layer 314 adsorbing a dye, an intermediate porous insulating layer 318 having electrolyte, and an opposed electrodes 315, is formed on each transparent conductive films 112, and the opposed electrodes 315 contacts the adjacent transparent conductive films 312 in such a way that the respective photoelectric conversion devices are connected in series, and the periphery of the respective photoelectric conversion devices is sealed with an insulating layer 313, and a top cover is laminated on the insulating layer 313 (Conventional Technology 4).

Patent Document 1: Japanese Patent No. 2664194
Patent Document 2: Published Japanese Translation of a PCT application No. 2002-540559
Patent Document 3: Japanese Unexamined Patent Publication No. 2005-285781

Patent Document 4: International Publican WO97/16838 pamphlet

DISCLOSURE OF THE INVENTION

Problems to be Solved by the Invention

However, all of the dye-sensitized solar cell modules proposed in Patent Documents 2 to 4 have a structure in which at least three layers are present between the photoelectric conversion layers of adjacent photoelectric conversion devices (for example, refer to a part A in FIG. 21). Since this part is a portion where power generation is not performed in the solar cell module, there was a problem that an area of a power generating area (photoelectric conversion layer) is reduced relative to a light receiving area of the dye-sensitized solar cell module and module conversion efficiency is deteriorated. Here, the term module conversion efficiency refers to the conversion efficiency of a solar cell calculated from a current density obtained from a module determined on the basis of an area of a whole light receiving plane of a module.

The present invention was made in view of the above state of the art, and it is an object of the present invention to provide a dye-sensitized solar cell module which can increase an effective power generating area for a light receiving plane of a solar cell module and a method for producing the same.

Means to Solve the Problems

Thus, in accordance with the present invention, there is provided a dye-sensitized solar cell module comprising a plurality of electrically series-connected solar cells each having a first conductive layer formed on an insulating substrate, a photoelectric conversion device formed on the first conductive layer, and a second conductive layer formed on the photoelectric conversion device, wherein the photoelectric conversion device has a photoelectric conversion layer comprising a porous semiconductor layer adsorbing a dye, a carrier transporting layer and a catalyst layer and wherein the second conductive layer of the above-described one solar cell contacts the first conductive layer of an adjacent another solar cell and the photoelectric conversion device of the above-described adjacent another solar cell contacts the second conductive layer of the above-described one solar cell.

Further, in accordance with another aspect of the present invention, there is provided a method for producing a dye-sensitized solar cell module including the steps of (A) forming a photoelectric conversion device having a photoelectric conversion layer comprising a porous semiconductor layer adsorbing a dye, a carrier transporting layer and a catalyst layer on each of a plurality of first conductive layers on an insulating substrate, and (B) forming a plurality of solar cells electrically connected in series by forming a second conductive layer which extends from above one photoelectric conversion device to a first conductive layer beneath an adjacent another photoelectric conversion device to contact the first conductive layer, wherein the second conductive layer of one solar cell is formed so as to contact the photoelectric conversion device of an adjacent another solar cell.

Effect of the Invention

In accordance with the present invention, it is possible to provide a dye-sensitized solar cell module which has an improved density of module output current and is high-performance and a method for producing a dye-sensitized solar cell module.

BRIEF DESCRIPTION OF THE DRAWINGS

FIG. 4 is a schematic sectional view showing a step of preparing a dye-sensitized solar cell module of Example 1.

FIG. 5 is a schematic sectional view showing a step of preparation following that in FIG. 4.

FIG. 8 is a schematic sectional view showing a step of preparing a dye-sensitized solar cell module of Example 2.

FIG. 10 is a schematic sectional view showing a step of preparation following that in FIG. 9.

FIG. 14 is a schematic sectional view showing a step of preparation following that in FIG. 13.

FIG. 15 is a schematic sectional view showing a step of preparation following that in FIG. 14.

Figure 1:
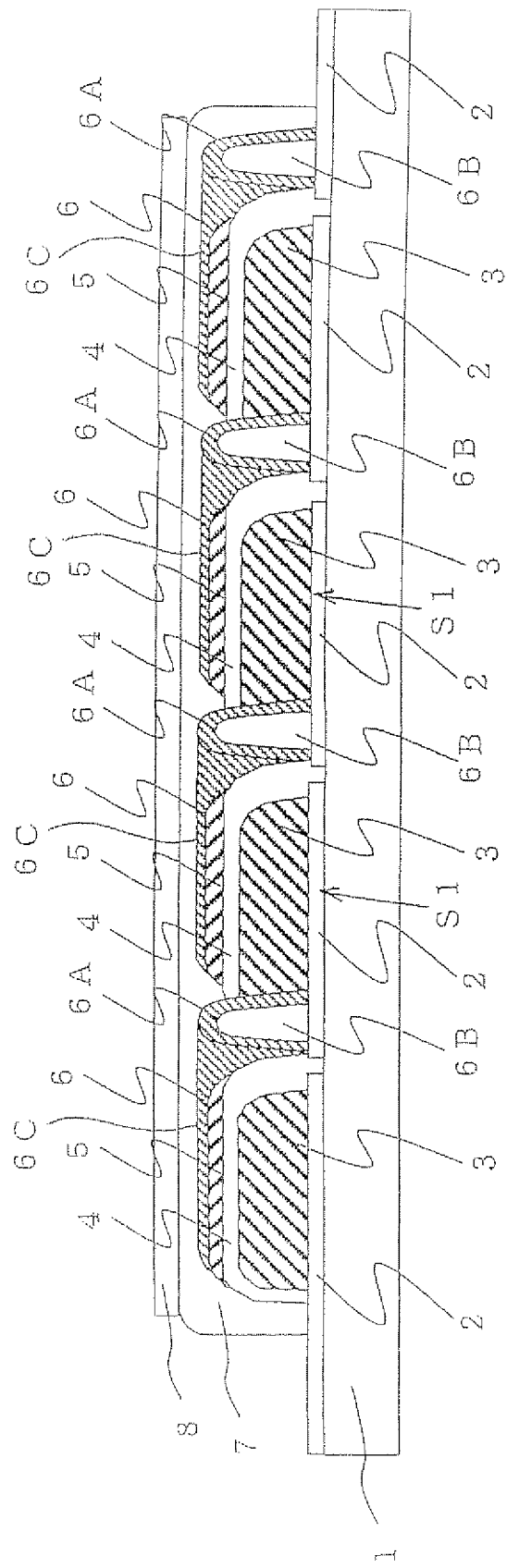
FIG. 1 is a schematic sectional view showing a constitution of Embodiment 1 of a dye-sensitized solar cell module of the present invention.

DESCRIPTION OF THE REFERENCE NUMERALS AND SYMBOLS 1, 21, 31 insulating substrate
2, 22, 32 first conductive layer
3, 23, 33 photoelectric conversion layer
3a, 23a, 33a porous semiconductor layer
4, 24, 34 carrier transporting layer
4a, 24a, 34a porous insulating layer
5, 25, 35 catalyst layer
6, 26, 36 second conductive layer 6A, 26A, 36A partial conductive layer
6B priming layer
6C, 26C, 36C another partial conductive layer
7, 27, 37 sealing layer
8, 28, 38 cover film

BEST MODE FOR CARRYING OUT THE INVENTION

A dye-sensitized solar cell module of the present invention which is characterized by providing a plurality of electrically series-connected solar cells each having a first conductive layer formed on an insulating substrate, a photoelectric conversion device formed on the first conductive layer, and a second conductive layer formed on the photoelectric conversion device, wherein the photoelectric conversion device has a photoelectric conversion layer composed of a porous semiconductor layer adsorbing a dye, a carrier transporting layer and a catalyst layer and wherein the second conductive layer of the one solar cell contacts the first conductive layer of an adjacent another solar cell and the photoelectric conversion device of the adjacent another solar cell contacts the second conductive layer of the abode-described one solar cell.

That is, the present invention pertains to a dye-sensitized solar cell module having a Z type structure, and this dye-sensitized solar cell module can increase a proportion of an effective or generating area and can improve a current density in comparison with a conventional dye-sensitized solar cell module by employing a structure in which the second conductive layer of one solar cell contacts the photoelectric conversion device of the adjacent solar cell.

Hereinafter, in the present specification, there may be cases where the "dye-sensitized solar cell module" is referred to as just a "solar cell module", the "solar cell" is referred to as just a "cell" and the "porous semiconductor layer adsorbing a dye" is referred to as just a "porous semiconductor layer".

In the present invention, the carrier transporting layer of one solar cell is separated from the carrier transporting layer of an adjacent another solar cell by the second conductive layer to prevent the carrier transporting layers from coming in contact with each other.

Heretofore, it was general that an insulating material such as a resin is installed between solar cells, if the carrier transporting materials in adjacent solar cells in a solar cell module can migrate between the adjacent solar cells, since this results in current leakage as a solar cell module. However, by installation of an insulating layer which is a non-power generating area, a ratio of an effective power generating area (particularly, a photoelectric conversion layer) to a light receiving plane of the solar cell module is decreased. Therefore, in the present invention, it is possible to attain a high-performance solar cell module in which migration of the carrier transporting material between cells does not occur by isolating the adjacent carrier transporting layers of cells from each other with the second conductive layer and in addition to this, a ratio of an effective power generating area (particularly, a photoelectric conversion layer) to a light receiving plane of the solar cell module is not decreased compared with the conventional because of the contact of the photoelectric conversion device with the second conductive layer.

In the present invention, the second conductive layer may be composed of two or more materials, and further may be composed of one or two or more layers.

When the second conductive layer is formed from paste using carbon particles generally known to be usable to the solar cell module, the carrier transporting material permeates between carbon particles in the formed second conductive layer and migrates to a neighboring solar cell. In order to prevent this problem, a technique of widening a width of the second conductive layer is conceivable, but an effective light receiving area to contribute to power generation is reduced by this technique. Furthermore, when an oxidation-reduction material is used for the carrier transporting material, if a material of the second conductive layer is a material having a catalytic power such as carbon, the surface of a second conductive layer in a neighboring cell exhibits an oxidation-reduction reaction to cause a short circuit in the solar cell module, and therefore a current cannot be withdrawn. Further, when a corrosive material is used to the carrier transporting material, the second conductive layer needs to be formed from a corrosion-resistant material.

Therefore, in the present invention, when an oxidation-reduction material is used for the carrier transporting material, a material not having a catalytic power is preferably used as a material of the second conductive layer, and examples of such a material include metals such as titanium, tantalum, nickel and the like, alloys containing one or more of metals such as titanium, tantalum, nickel, tin, aluminum, zinc, magnesium, indium, molybdenum, tungsten and the like, and combinations of the above metal and alloy, and one or two or more of these metals and alloys can be selectively used. Further, examples of the material of the second conductive layer include transparent conductive metal oxides such as ITO (indium tin complex oxide), IZO (indium zinc complex oxide), fluorine-doped $SnO_2$, boron-, gallium- or aluminum-doped ZnO and niobium-doped titanium oxide.

Since the second conductive layer undertakes a role of preventing migration of the carrier transporting material between adjacent solar cells, as described above, in the case where the second conductive layer is formed (particularly formed as one layer) by a vapor deposition method or a sputtering method using one or more materials selected from the above-mentioned metals, alloys and metal oxides, it is preferable to form a second conductive layer of such a closely packed film that the carrier transporting material does not permeate into the second conductive layer. That is, since the second conductive layer is a deposited film prepared by depositing the above materials by a vapor deposition method or a sputtering method, if a closely packed deposited film is formed by adjusting the conditions of film formation, the carrier transporting material does not permeate into the second conductive layer. On the other hand, when the closely packed deposited film is not formed, these gaps will become voids to allow the carrier transporting material to permeate and the carrier transporting material is permeated through the deposited film to cause the leakage of current. In addition, in the case where the second conductive layer is not formed into a closely packed film, a time of forming a film can be shortened compared with the case where the second conductive layer is formed into a closely packed film.

When the second conductive layer is composed of two or more layers having different materials, the following constitutions (a) to (c) can be employed.

(a) A priming layer of the second conductive layer, made of an inorganic material, is formed between device-forming regions or in the vicinity thereof, and thereon, a partial conductive layer constituting a part of the second conductive layer is formed, and another partial conductive layer constituting another part of the second conductive layer is formed from above the photoelectric conversion device to the partial conductive layer.

(b) A priming layer of the second conductive layer, made of a resin material, is formed between device-forming regions or in the vicinity thereof, and thereon, a partial conductive layer constituting a part of the second conductive layer is formed, and another partial conductive layer constituting another part of the second conductive layer is formed from above the photoelectric conversion device to the partial conductive layer.

(c) A partial conductive layer constituting a part of the second conductive layer is formed between device-forming regions or in the vicinity thereof, and after this partial conductive layer is impregnated with a resin and the resin is cured, another partial conductive layer constituting another part of the second conductive layer is formed from above the photoelectric conversion device to the partial conductive layer.

When an inorganic material is used for the priming layer of the second conductive layer and a corrosive material is used to the carrier transporting material, it is preferable that the priming layer is also formed from a corrosion-resistant material, such as silicon oxide, boron oxide, bismuth oxide, titanium oxide, etc. Further, as resins to be used in the priming layer and to be permeated in the partial conductive layer of the second conductive layer, a resin for forming a sealing layer to encapsulate the solar cell, which is described later, can be employed.

(d) Further, it is also possible that the priming layer of the second conductive layer is not formed from the above-mentioned inorganic material or resin material but formed from the above-mentioned material for forming the second conductive layer and further an insulating layer is formed between the photoelectric conversion device and the second conductive layer in each solar cell. This insulating layer can be formed from the same inorganic material as that for forming the above priming layer.

(e) Furthermore, after the second conductive layer is formed in the above constitution (a), a resin material may be permeated into a gap in the second conductive layer to form the second conductive layer.

By employing such the constitutions (a) to (e), an effect of preventing the migration of the carrier transporting material can be further enhanced. By forming the photoelectric conversion device (especially photoelectric conversion layer) so as to contact the second conductive layer and the insulating layer after forming the second conductive layer (partial conductive layer) and the insulating layer, an area of a non-power generating area can be outstandingly decreased and an area of a power generating area can be outstandingly increased compared with a conventional technology.

The dye-sensitized solar cell module of the present invention preferably has a sealing layer to encapsulate a plurality of solar cells formed on the insulating substrate as a whole, and furthermore may have a cover film on the sealing layer.

Next, the respective constituent elements of the dye-sensitized solar cell module of the present invention will be specifically described.

(Insulating Substrate)

The insulating substrate (hereinafter, it may be referred to as just a "substrate") is required to have at least a light transmitting property when it is located on the side of a light-receiving plane of a solar cell, and it preferably have a thickness of about 0.2 to 5 mm.

Examples of a light-transmitting material composing the substrate include glass substrates of soda glass, fused quartz glass, or crystalline quartz glass, heat resistant resin plates such as a flexible film, and the like.

Examples of a material composing the flexible film (hereinafter, referred to as a "film") include tetraacetyl cellulose (TAC), polyethylene terephthalate) (PET), poly(phenylene sulfide) (PPS), polycarbonate (PC), polyallylate (PA), poly (ether imide) (PEI), and a phenoxy resin. In the case where another layer is formed on the substrate by heating, for example, in the case where a conductive layer is formed on the substrate by heating to about 250° C., Teflon (registered trademark) having heat resistant at a temperature of 250° C. or more is particularly preferable among the above film materials.

Further, when a completed solar cell module is attached to another structure, a substrate can be utilized. That is, a peripheral part of the substrate can be readily fixed to another support using metal processing parts and screws.

(First Conductive Layer)

The first conductive layer requires a light-transmitting property when it is located on the side of a light receiving plane of a solar cell. However, it may be one through which at least light of a wavelength having effective sensitivity to a sensitized dye described later substantially passes, and the first conductive layer does not necessarily require to have a light-transmitting property for light of all wavelength regions.

Examples of a light-transmitting material of the first conductive layer include indium tin complex oxide (ITO), fluorine-doped tin oxide (FTO), and zinc oxide (ZnO). Particularly, a transparent conductive substrate, prepared by laminating a transparent conductive layer made of FTO on a transparent substrate (support) made of soda-lime float glass, is suitable for the present invention. A method of forming the transparent conductive layer on the transparent substrate is not particularly limited, and examples of the method include publicly known methods such as a sputtering method and a spraying method. A film thickness of the transparent conductive layer is preferably about 0.02 to 5 μm, and a film preferably has a lower resistance and a film resistance is preferably 40 ohm/sq or less.

Further, a metal lead may be added in order to reduce resistance of the first conductive layer. As a material of the metal lead, platinum, gold, silver, copper, aluminum, nickel, and titanium are preferable. The metal lead can be formed on a substrate, for example, by a publicly known method such as a sputtering method, a vapor deposition method or a screen printing method, and the first conductive layer can be formed on the substrate including the metal lead. Alternatively, after the first conductive layer is formed on the substrate, the metal lead may be formed thereon. However, since installation of the metal lead leads to reduction in a quantity of incident light, a thickness of the metal lead is preferably about 0.1 to 4 mm. Further, when the metal lead is corroded by a carrier transporting layer described later, it is preferred to protect the metal lead with a glass material containing silicon oxide.

(Porous Semiconductor Layer)

The porous semiconductor layer is composed of semiconductor, and as its form, various forms such as a form of particle, a form of film having many micropores and the like can be used, but the form of film is preferable. A semiconductor composing the porous semiconductor layer is not particularly limited as long as it is generally used in photoelectric conversion materials, and examples of the semiconductor include simple compounds such as titanium oxide, iron oxide, niobium oxide, zirconium oxide, cerium oxide, tungsten oxide, nickel oxide, strontium titanate, cadmium sulfide, lead sulfide, zinc sulfide, indium phosphide, copper-indium sulfide ($CuInS_2$), $CuAlO_2$, and $SrCu_2O_2$, or combinations thereof. Among others, titanium oxide, zinc oxide, tin oxide, and niobium oxide are preferable, and titanium oxide is particularly preferable from the viewpoint of photoelectric conversion efficiency, stability and safety.

In the present invention, titanium oxide includes various titanium oxides in narrow definition such as anatase type titanium oxide, rutile type titanium dioxide, amorphous titanium oxide, metatitanic acid and orthotitanic acid, and titanium hydroxide and hydrated titanium oxide. Two species of crystals, anatase type and rutile type, can become any type of anatase type and rutile type depending on their production methods or heat histories, but the anatase type is common. Particularly, as for sensitization of organic dye of the present invention, titanium oxide having a high content of anatase type is preferable and a proportion of the anatase type is preferably 80% or more.

The above-mentioned semiconductor composing the porous semiconductor layer is preferably a polycrystalline sintered body made of fine particles from the viewpoint of stability, easiness of crystal growth, and production cost. Further, the same or different semiconductors having two or more particle sizes may be mixed.

The ratio between average particle diameters of the semiconductor particles having different particle sizes is preferably 10-folds or more. The semiconductor particle with a larger average particle diameter can be used for the purpose of scattering incident light and improving a light trapping ratio, and its average particle diameter is preferably 100 to 500 nm. The semiconductor particle with a smaller average particle diameter may be mixed with the semiconductor particle with a larger average particle diameter for the purpose of increasing number of adsorption points of a dye to increase the absorption amount, and its average particle diameter is preferably 5 to 50 nm. Particularly, when different semiconductors are mixed, if a semiconductor having high adsorption action of a dye is designated as a semiconductor with a smaller particle diameter, the absorption amount of the dye can be more increased with effect.

Furthermore, the porous semiconductor layer preferably has a structure of two or more layers so that incident light can be utilized to a maximum extent, and it is particularly preferable to laminate from a layer having low light scattering property (low scattering layer) to a layer having a high light scattering property (high scattering layer) in an order from the light entering side.

A method of forming the filmy porous semiconductor layer on the first conductive layer is not particularly limited, and examples of the method of forming the porous semiconductor layer include publicly known methods. Specific examples of the methods include (1) a method in which paste containing semiconductor particles is applied onto the first conductive layer by a screen printing method or an ink-jet method and then fired, (2) a method of forming a film on the first conductive layer by a CVD method or a MOCVD method to use a desired raw material gas, (3) a method of forming a film on the first conductive layer by a PVD method, a vapor deposition method or a sputtering method to use a solid raw material, and (4) a method of forming a film on the first conductive layer by a sol-gel method or an electrochemical method using an oxidation-reduction reaction. Among these methods, the screen printing method, in which paste is used, is particularly preferable since a porous semiconductor layer of a thick film can be formed at low cost by this method.

A film thickness of the porous semiconductor layer is not particularly limited, but it is preferably about 0.5 to 50 μm from the viewpoint of photoelectric conversion efficiency. Further, a width of the porous semiconductor layer is not particularly limited, but a width of about 1 to 20 mm is preferably used and this width may be widened when a lead is formed on the first conductive layer as described above.

Further, it is preferred that more dyes described later are adsorbed on the porous semiconductor layer and a photoelectric conversion layer is formed by using the resulting porous semiconductor layer for improving the photoelectric conversion efficiency of the solar cell. Therefore, the filmy porous semiconductor layer preferably has a large specific surface area and a specific surface area of about 10 to 200 $m^2/g$ is preferable. In addition, a specific surface area shown in the present specification is a value measured by a BET adsorption method.

Examples of the above semiconductor particles include particles made of an element semiconductor or a compound semiconductor, which have an appropriate average particle diameter, for example about 1 to 500 nm, among commercially available particles.

An example of a method of forming a porous semiconductor layer by using a titanium oxide particle as a semiconductor particle will be specifically described.

First, 125 ml of titanium isopropoxide (produced by KISHIDA CHEMICAL Co., Ltd., Japan) were added dropwise to 750 ml of a 0.1 M aqueous solution of nitric acid (produced by KISHIDA CHEMICAL Co., Ltd.) to perform a hydrolysis, and the resulting mixture was heated to 80° C. for 8 hours to prepare a sol solution. Thereafter, the sol solution was kept at 230° C. for 11 hours in a titanium autoclave to allow particles to grow, and a colloidal solution containing titanium oxide particles having an average primary particle diameter of 15 nm was prepared by performing ultrasonic dispersing for 30 minutes, and a twofold amount of ethanol was added to the colloidal solution and the mixture was centrifuged at 5000 rpm, and thereby titanium oxide particles can be prepared. In addition, an average particle diameter in the present specification was measured by SEM observations.

Next, the resulting titanium oxide particles was cleaned, and to this, a solution formed by dissolving ethyl cellulose and terpineol in absolute ethanol was added, and the resulting mixture was stirred to disperse the titanium oxide particle. Then, the mixed solution was heated in a vacuum to evaporate ethanol to obtain titanium oxide paste. The concentration of the paste was adjusted in such a way that for example, the solid content of titanium oxide was 20% by weight, the content of ethyl cellulose was 10% by weight and the content of terpineol was 64% by weight as final composition.

Examples of a solvent to be used for preparing suspended paste containing semiconductor particles include glyme solvents such as ethylene glycol monomethyl ether, alcohol solvents such as isopropyl alcohol, mixed solvents such as isopropyl alcohol/toluene, and water in addition to the above solvents.

Next, the paste containing semiconductor particles is applied onto the first conductive layer by the above method, and applied paste is fired to obtain a porous semiconductor layer. In drying and firing, it is necessary to adjust appropriately conditions of temperature, time, atmosphere and the like according to species of the substrate or the semiconductor particles to be used. Firing can be performed, for example, at a temperature of about 50 to 800° C. over about 10 second to 12 hours in an atmosphere of air or an atmosphere of inert gas. These drying and firing can be performed once at one temperature, or can be performed twice or more at varying temperatures.

(Dye)

Examples of a dye adsorbed on the porous semiconductor layer to function as a photosensitizer include organic dyes and metal complex dyes, which have absorption in at least one of a region of various visible light and a infrared region, and one or more of various photosensitizing dyes can be selectively used.

Examples of organic dyes include azo dyes, quinone dyes, quinone imine dyes, quinacridone dyes, squarylium dyes, cyanine dyes, merocyanine dyes, triphenylmethane dyes, xanthene dyes, porphyrin dyes, perylene dyes, indigo dyes, and naphthalocyanine dyes. The organic dyes generally have a larger absorptivity than metal complex dyes having a coordinate bond conformation in which molecules bond to a transition metal.

Examples of the metal complex dye include metal complex dyes having a coordinate bond conformation in which molecules bond to a metal such as Cu, Ni, Fe, Co, V, Sn, Si, Ti, Ge, Cr, Zn, Ru, Mg, Al, Pb, Mn, In, Mo, Y, Zr, Nb, Sb, LA, W, Pt, Ta, Pd, Os, Ga, TB, Eu, Rb, Bi, Se, As, Sc, Ag, Cd, Hf, Re, Au, Ac, Tc, Te and Rh, and phthalocyanine dyes and ruthenium dyes are preferably used. Among these dyes, ruthenium metal complex dyes are more preferable, and particularly dyes expressed by the formula (1), (2) or (3) are preferable.

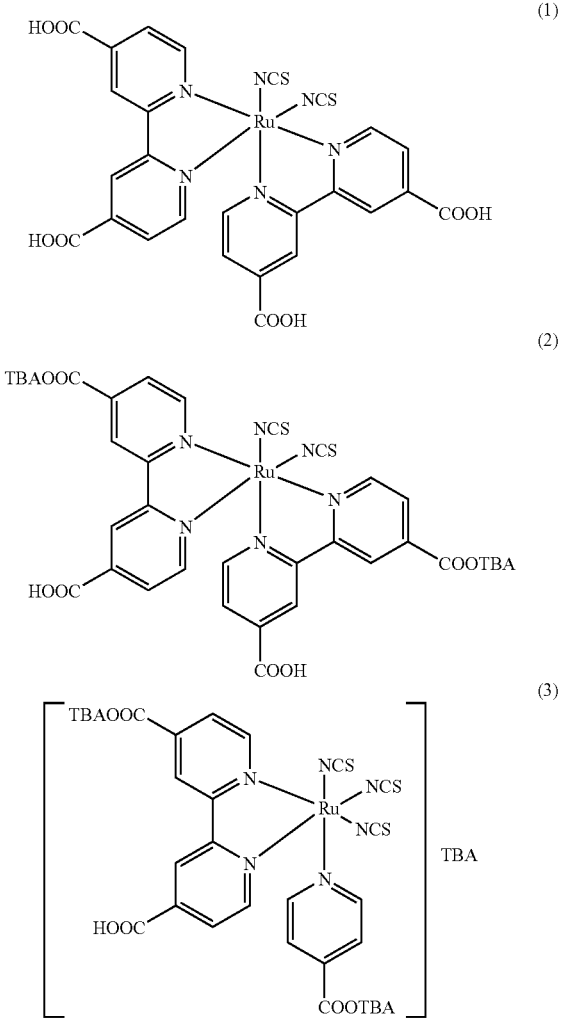

Further, compounds having an interlock group such as a carboxylic acid group, a carboxylic anhydride group, an alkoxy group, a hydroxyl group, a hydroxyalkyl group, a sulfonic acid group, an ester group, a mercapto group or a phosphoryl group in a dye molecule are preferable for adsorbing dye firmly on the porous semiconductor layer. Among these dyes, the carboxylic acid group and the carboxylic anhydride group are particularly preferable. In addition, the interlock group provides an electrical bond to facilitate an electron transfer between a dye in an excited state and a conduction band of the porous semiconductor layer.

Examples of a method of adsorbing the dye on the porous semiconductor layer include a method in which the porous semiconductor layer formed on the first conductive layer is immersed in a solution (solution for adsorbing a dye) in which the dye is dissolved.

The solvent in which the dye is dissolved may be one which dissolves a dye to be used, and specific examples of the solvent include alcohols such as ethanol and the like, ketones such as acetone and the like, ethers such as diethyl ether, tetrahydrofuran and the like, nitrogen compounds such as acetonitrile and the like, halogenated aliphatic hydrocarbons such as chloroform and the like, aliphatic hydrocarbons such as hexane and the like, aromatic hydrocarbons such as benzene and the like, esters such as ethyl acetate and the like, and water. These solvents may be used in combination of two or more thereof.

The concentration of dye in the solution can be appropriately adjusted in accordance with the species of a dye and a solvent to be used, but a higher concentration is preferable for improving an adsorptive function, and for example, the concentration of $5 \times 10^{-4}$ mol/liter or more is preferable.

(Carrier Transporting Layer)

The carrier transporting layer has a carrier transporting material capable of transporting ions and a porous insulating layer which can electrically isolate a porous photoelectric conversion layer from a catalyst layer and supports the carrier transporting material to enable ions (for example, iodine ions) to migrate between the porous photoelectric conversion layer and the catalyst layer.

<Carrier Transporting Material>

Examples of a suitable carrier transporting material used in the carrier transporting layer include a liquid electrolyte, a solid electrolyte, a gel electrolyte, and a molten salt gel electrolyte.

The liquid electrolyte may be a liquid substance containing an oxidation-reduction species, and it is not particularly limited as long as it can be generally used in batteries or solar cells. Specific examples of the liquid electrolyte include substances containing an oxidation-reduction species and a solvent in which the species can be dissolved, substances containing an oxidation-reduction species and molten salt in which the species can be dissolved, and substances containing an oxidation-reduction species, a solvent and molten salt in which the species can be dissolved.

The solid electrolyte may be a substance which is a carrier transporting material capable of transporting electrons, holes and ions, can be used as an electrolyte of the dye-sensitized solar cell and does not have fluidity. Specific examples of the solid electrolyte include hole transporting materials such as polycarbazole and the like, electron transporting materials such as tetranitrofluorene and the like, conductive polymers such as polyrols and the like, polymer electrolytes obtained by solidifying a liquid electrolyte with a polymeric compound, p-type semiconductors such as copper iodide, copper thiocyanate and the like, and electrolytes obtained by solidifying a liquid electrolyte including molten salt with fine particles.

The gel electrolyte generally includes an electrolyte and a gelling agent. Examples of the gelling agent include polymer gelling agents such as crosslinked polyacrylic resin derivatives, crosslinked polyacrylonitrile derivatives, polyalkylene oxide derivatives, silicone resins, and polymers having a nitrogen-containing heterocyclic quaternary compound salt structure in the side chains, and these gelling agents can be suitably used.

The molten salt gel electrolyte generally includes a gel electrolyte material and an ambient temperature type molten salt. Examples of the ambient temperature type molten salt include nitrogen-containing heterocyclic quaternary ammonium compound salts such as pyridinium salts, imidazolium salts and the like, and these molten salts can be suitably used.

Examples of the oxidation-reduction species used in the present invention include oxidation-reduction species such as $I^-/I_3^-$ type, $Br_2^-/Br_3^-$ type, $Fe_2^+/Fe_3^+$ type, quinine/hydroquinone type oxidation-reduction species and the like.

Specifically, combinations of metal iodides such as lithium iodide (LiI), sodium iodide (NaI), potassium iodide (KI), and calcium iodide ($CaI_2$) and iodine ($I_2$), combinations of tetraalkyl ammonium salt such as tetraethylammonium iodide (TEAI), tetrapropylammonium iodide (TPAI), tetrabutylammonium iodide (TBAI), and tetrahexylammonium iodide (THAI) and iodine, and combinations of metal bromides such as lithium bromide (LiBr), sodium bromide (NaBr), potassium bromide (KBr), and calcium bromide ($CaBr_2$) and bromine are preferable, and among these combinations, the combination of Li and $I_2$ is particularly preferable.

Examples of a solvent for the oxidation-reduction species include carbonate compounds such as propylene carbonate and the like, nitrile compounds such as acetonitrile and the like, alcohols such as ethanol and the like, water, and aprotic polar materials. Among these solvents, carbonate compounds and nitrile compounds are particularly preferable. These solvents may be used as a mixture of two or more thereof.

Nitrogen-containing aromatic compounds such as tert-butylpyridine (TBP), or imidazole salts such as dimethylpropylimidazole iodide (DMPII), methylpropylimidazole iodide (MPII), ethylmethylimidazole iodide (EMII), ethylimidazole iodide (EII), and hexylmethylimidazole iodide (HMII) may be added as an additive.

The concentration of electrolyte in the carrier transporting material is preferably 0.001 to 1.5 mol/liter, and particularly preferably 0.01 to 0.7 mol/liter. Further, these carrier transporting layers may be formed in the porous insulating layer.

<Porous Insulating Layer>

Examples of a material of a porous insulating layer used in the carrier transporting layer include glass, zirconia oxide, silicon oxide, aluminum oxide, boron oxide, aluminum nitride, and silicon nitride. A method of preparing the porous insulating layer is not particularly limited as long as the second conductive layer to be further laminated on this porous insulating layer can be prepared in the configuration in which the second conductive layer does not contact the first conductive layer, and the porous insulating layer can be formed, for example, by the same method as in the porous semiconductor layer. Further, the porous insulating layer can also serve as a highly scattering layer for the above porous semiconductor layer.

(Catalyst Layer)

The catalyst layer is formed on the above porous insulating layer. That is, the catalyst layer is in contact with the photoelectric conversion layer. As a material composing the catalyst layer, a material, which activates an oxidation-reduction reaction of the carrier transporting layer, is preferable. For example, platinum (work function: 6.35 eV), and carbons (work function: 4.7 eV) such as carbon black, graphite, glass carbon, amorphous carbon, hard carbon, soft carbon, carbon whisker, carbon nanotube, and fullerene are preferable.

The catalyst layer can be formed by a publicly known technology such as a PVC method, a vapor deposition method or a sputtering method in the case of using platinum for the catalyst layer, and can be formed by applying paste prepared by dispersing carbon in a solvent by an application method such as a screen printing method to form an applied film, and drying and firing the film in the case of using carbon.

(Second Conductive Layer)

A partial conductive layer and an another partial conductive layer of the second conductive layer can be formed by a vapor deposition method or a sputtering method using one or a selective combination of two or more of the above-mentioned metals, alloys and metal oxides.

Further, a priming layer of the second conductive layer can be formed by applying the above-mentioned inorganic material or resin material for forming a sealing layer by a screen printing method to form an applied film, and drying and firing the film.

(Sealing Layer)

The sealing layer is important for preventing the carrier transporting material in the carrier transporting layer from volatilizing and preventing water permeation into a solar cell. The sealing layer is important for absorbing an impact of falling object or stress (impact) which affects the solar cell module and for absorbing flexures which affects the substrate when used over an extended period of time.

The material composing the sealing layer is preferably silicone resins, epoxy resins, polyisobutylene type resins, hot melt resins, glass frits, and two or more species of these materials may be used in the form of two or more layers. When a nitrile type solvent or a carbonate type solvent is used as a solvent for a redox electrolyte, silicone resins, hot melt resins (e.g., ionomer resins), polyisobutylene type resins, and glass frits are particularly preferable.

A pattern of the sealing layer can be formed by using a dispenser in the case of using silicone resins, epoxy resins, or glass frits and by forming patterned holes in a sheet-like hot melt resin in the case of using the hot melt resins.

(Cover Film)

The cover film is not particularly limited, but it is preferable to use plastic films such as polyethylene and the like since the weight and the production cost of the solar cell module can be reduced, and a thickness of the cover film is suitably about 50 to 1000 µm. Further, a laminated structure of metal and plastic, which is used in lithium batteries, may be employed.

Hereinafter, the embodiments of various structures of the dye-sensitized solar cell module of the present invention will be described in detail by way of drawings, but the present invention is not limited to these embodiments.

Embodiment 1

FIG. 1 is a schematic sectional view showing a constitution of Embodiment 1 of the dye-sensitized solar cell module of the present invention.

The dye-sensitized solar cell module of Embodiment 1 is composed of a plurality of electrically series-connected solar cells S1 having a transparent insulating substrate 1, a transparent first conductive layer 2 formed on the insulating substrate 1, a photoelectric conversion device obtained by forming a photoelectric conversion layer 3 comprising a porous semiconductor layer adsorbing a dye, a carrier transporting layer 4 and a catalyst layer 5 subsequently on the first conductive layer 2, and a second conductive layer 6 formed on the photoelectric conversion device, wherein all of a plurality of cells S1 are covered with a sealing layer 7 and a cover film 8 is laminated on the sealing layer 7. In addition, existence of transparency of the sealing layer 7 and the cover film 8 is not particularly restricted.

Structural features of this solar cell module of Embodiment 1 are that a second conductive layer 6 of one solar cell S1 extends to a first conductive layer 2 of an adjacent another solar cell S1 to contact the first conductive layer 2 and that a photoelectric conversion layer 3 of the adjacent another solar cell S1 contacts the second conductive layer 6 of the one solar cell S1 and that the second conductive layer 6 has a three-layer structure in which two kinds of materials are used.

This structure of the solar cell module will be described in more detail. A plurality of the first conductive layers 2 are discretely formed at predetermined intervals on the substrate 1, and a priming layer 6B which is one of layers composing the second conductive layer 6 is formed on a left end of each first conductive layer 2 other than a first conductive layer 2 located at a leftmost position in FIG. 1. This priming layer 6B is made of an inorganic material or a resin material. Furthermore, a partial conductive layer 6A, which is one of layers composing the second conductive layer 6, is formed on each priming layer 6B. In addition, a film thickness of the priming layer 6B is preferably about 1 to 100 μm, and a width of the priming layer 6B in a direction of a substrate plane is preferably about 1 to 1000 μm. Further, a film thickness of the partial conductive layer 6A is preferably about 1 to 100 nm. However, these values are not limited to these since it is associated with a film thickness of the photoelectric conversion layer described later.

In each photoelectric conversion device formed on each first conductive layer 2 other than a first conductive layer 2 located at a leftmost position in FIG. 1, the photoelectric conversion layer 3 contacts the above partial conductive layer 6A, and the carrier transporting layer 4 is laminated on the photoelectric conversion layer 3, and one end of the carrier transporting layer 4 contacts the partial conductive layer 6A and the other end contacts the surface of the substrate 1 between the first conductive layers 2, 2. In one cell S1, the priming layer 6 mainly prevents the carrier transporting material in the carrier transporting layer 4 from migrating to a neighboring cell S1. Therefore, a total film thickness of the photoelectric conversion layer 3 and the carrier transporting layer 4 is preferably smaller than that of the priming layer 6B.

Further, the catalyst layer 5 is laminated on the carrier transporting layer 4, and further another partial conductive layer 6C, which is one of layers composing the second conductive layer 6, is laminated on the catalyst layer 5 and on a part of the partial conductive layer 6A so as to fill the gap between the photoelectric conversion device and the partial conductive layer 6A. This another partial conductive layer 6C can be formed from a different conductive material from the partial conductive layer 6A, but it is preferable because of reduction in film-forming time to form the another partial conductive layer 6C from the same material as that of the partial conductive layer 6A.

In addition, another partial conductive layer 6C on a photoelectric conversion device in the leftmost solar cell S1 in FIG. 1 is also formed so as to contact the partial conductive layer 6A.

Embodiment 2

Figure 2:
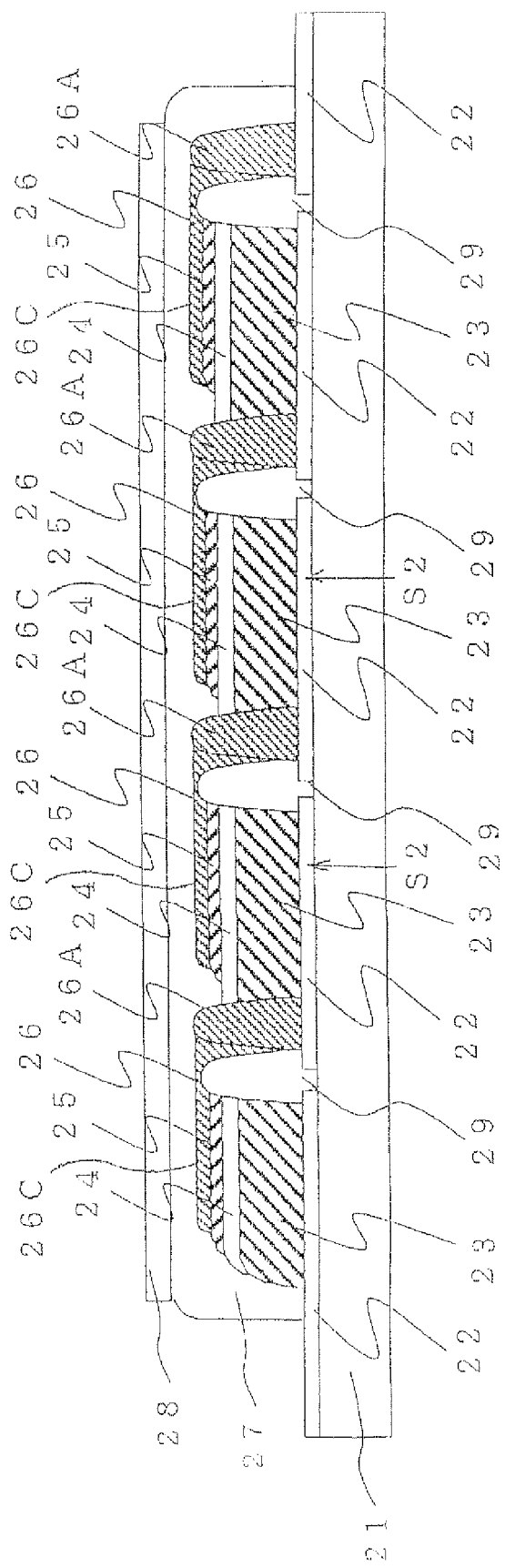
FIG. 2 is a schematic sectional view showing a constitution of Embodiment 2 of the dye-sensitized solar cell module of the present invention.

FIG. 2 is a schematic sectional view showing a constitution of Embodiment 2 of the dye-sensitized solar cell module of the present invention.

In the same manner as in Embodiment 1, the dye-sensitized solar cell module of Embodiment 2 is composed of a plurality of series-connected solar cells S2 having a transparent insulating substrate 21, a transparent first conductive layer 22 formed on the insulating substrate 21, a photoelectric conversion device obtained by forming a photoelectric conversion layer 23 comprising a porous semiconductor layer adsorbing a dye, a carrier transporting layer 24 and a catalyst layer 25 subsequently on the first conductive layer 22, and a second conductive layer 26 formed on the photoelectric conversion device, wherein all of a plurality of cells S2 are covered with a sealing layer 27 and a cover film 28 is laminated on the sealing layer 27.

Structural features of this solar cell module of Embodiment 2, differing from those of Embodiment 1, are that an insulating layer 29 is formed between a second conductive layer 26 and a photoelectric conversion device in each solar cell S1 and that the second conductive layer 26 has a two-layer structure in which a kind of material is used.

Difference of a structure of this solar cell module from that of Embodiment 1 will be mainly described. An insulating layer 29 made of an inorganic material or a resin material is located between adjacent two first conductive layers 22, and a partial conductive layer 26A which is one of layers composing the second conductive layer 6 is formed on a left end of each first conductive layer 22 other than a first conductive layer 22 located at a leftmost position in FIG. 1. A film thickness of this insulating layer 29 is preferably about 1 to 100 μm, and a width of the insulating layer 29 in a direction of a substrate plane is preferably about 1 to 1000 μm. Further, a film thickness of the partial conductive layer 26A is preferably about 1 to 100 nm, and a width of the partial conductive layer 26A in a direction of a substrate plane is preferably about 1 to 1000 μm.

Further, another partial conductive layer 26C, which is one of layers composing the second conductive layer 26, is laminated on the catalyst layer 25 and on a part of the partial conductive layer 26A so as to fill the gap between the photoelectric conversion device and the partial conductive layer 26A. This another partial conductive layer 26C can be formed from a different conductive material from the partial conductive layer 26A, but it is preferable because of reduction in film-forming time to form the another partial conductive layer 6C from the same material as that of the partial conductive layer 6A.

In each photoelectric conversion layer 23 and carrier transporting layer 24 formed on each first conductive layer 2 other than a first conductive layer 2 located at a leftmost position in FIG. 2, the respective one ends of these layers 23, 24 contact the partial conductive layer 26A, and the respective other ends contact the insulating layer 29. In addition, in the leftmost photoelectric conversion device in FIG. 2, only one end contacts the insulating layer 29. In the solar cell module thus constructed, the insulating layer 29 mainly prevents the carrier transporting material in the carrier transporting layer 24 of each cell S2 from migrating to a neighboring cell S2. Therefore, a total film thickness of the photoelectric conversion layer 23 and the carrier transporting layer 24 is preferably smaller than that of insulating layer 29.

Embodiment 3

Figure 3:
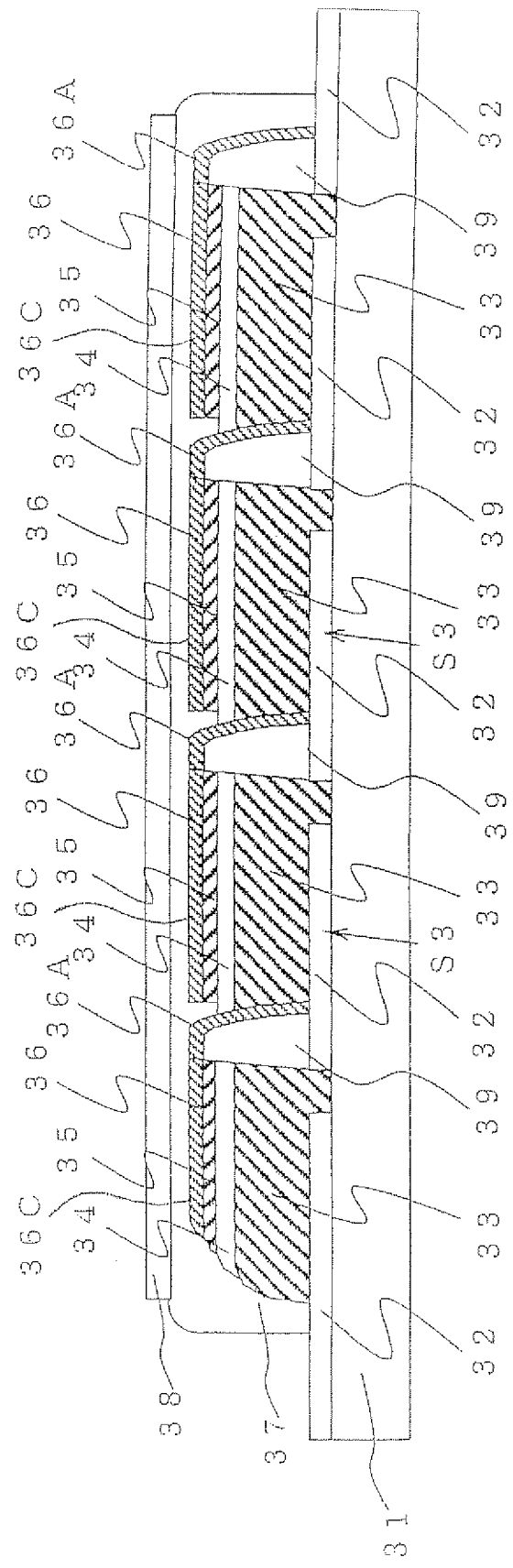
FIG. 3 is a schematic sectional view showing a constitution of Embodiment 3 of the dye-sensitized solar cell module of the present invention.

FIG. 3 is a schematic sectional view showing a constitution of Embodiment 3 of the dye-sensitized solar cell module of the present invention.

In the same manner as in Embodiments 1 and 2, the dye-sensitized solar cell module of Embodiment 3 is composed of a plurality of series-connected solar cells S3 having a transparent insulating substrate 31, a transparent first conductive layer 32 formed on the insulating substrate 31, a photoelectric conversion device obtained by forming a photoelectric conversion layer 33 comprising a porous semiconductor layer adsorbing a dye, a carrier transporting layer 34 and a catalyst layer 35 subsequently on the first conductive layer 32, and a second conductive layer 36 formed on the photoelectric conversion device, wherein all of a plurality of cells S3 are covered with a sealing layer 37 and a cover film 38 is laminated on the sealing layer 37.

Structural features of this solar cell module of Embodiment 3, differing from those of Embodiments 1 and 2, are that an insulating layer 39 also serving as a priming layer of a partial conductive layer 36A which is one of layers composing the second conductive layer 36 is formed between a second conductive layer 26 and a photoelectric conversion device in each solar cell S1 and that each photoelectric conversion layer 33 extends to an area between adjacent two first conductive layers 32 to contact the insulating layer 39.

Difference of a structure of this solar cell module from those of Embodiment 1 and Embodiment 2 will be mainly described. An insulating layer 39 made of an inorganic material or a resin material is formed on a left end of each first conductive layer 32 other than a first conductive layer 32 located at a leftmost position in FIG. 3, and the above partial conductive layer 36A is laminated on the insulating layer 39. A film thickness of this insulating layer 39 is preferably about 1 to 100 μm, and a width of the insulating layer 39 in a direction of a substrate plane is preferably about 1 to 1000 μm. Further, a film thickness of the partial conductive layer 36A is preferably about 1 to 100 μm.

Further, another partial conductive layer 36C, which is one of layers composing the second conductive layer 36, is laminated on the catalyst layer 35 in a state of contacting the partial conductive layer 36A. This another partial conductive layer 36C can be formed from a different conductive material from the partial conductive layer 36A, but it is preferable because of reduction in film-forming time to form the another partial conductive layer 36C from the same material as that of the partial conductive layer 36A.

In each photoelectric conversion layer 33 and carrier transporting layer 34 formed on each first conductive layer 2 other than a first conductive layer 2 located at a leftmost position in FIG. 2, the respective one ends of these layers 33, 34 contact the partial conductive layer 36A, and the respective other ends contact the insulating layer 39. In addition, in the leftmost photoelectric conversion device in FIG. 3, only one end contacts the insulating layer 39. In the solar cell module thus constructed, the insulating layer 39 mainly prevents the carrier transporting material in the carrier transporting layer 34 of each cell S3 from migrating to a neighboring cell S3. Therefore, a total film thickness (excluding a thickness of the first conductive layer 32) of the photoelectric conversion layer 33 and the carrier transporting layer 34 is preferably smaller than that of insulating layer 39.

Other Embodiments

1. In Embodiment 1, the case where the priming layer 6B is formed from an inorganic material or a resin material has been described, but a partial conductive layer of the second conductive layer, which is obtained by impregnating the conductive layer with a resin material, may be formed at a position where the priming layer 6B and the partial conductive layer 6A are formed, and migration of the carrier transporting material in the carrier transporting layer between cells can also be prevented by this partial conductive layer.

2. In Embodiment 3, the case where the insulating layer 39 is formed from an inorganic material or a resin material has been described, but a partial conductive layer of the second conductive layer, which is obtained by impregnating the conductive layer with a resin material and curing the resin material, may be formed at a position where the insulating layer 39 and the partial conductive layer 36A are formed, and migration of the carrier transporting material in the carrier transporting layer between cells can also be prevented by this partial conductive layer.

3. In Embodiment 2, the case where the insulating layer is formed separately from the second conductive layer has been described, but the priming layer of the second conductive layer may be formed as with Example 3 described later in which a dye-sensitized solar cell module is prepared. Furthermore, in this case, two layers of an insulating layer 29 and a priming layer of a second conductive layer 26A may be simultaneously formed by a screen printing method, or the insulating layer 29 and the priming layer of the second conductive layer 26A was formed as one layer, and then the layer may be separated into two parts with the laser scribing apparatus described above to form the insulating layer 29 and the priming layer of the second conductive layer 26A.

A method for producing the dye-sensitized solar cell module of the present invention thus formed, which includes Embodiments 1 to 3, includes the steps of (A) forming a photoelectric conversion device having a photoelectric conversion layer comprising a porous semiconductor layer adsorbing a dye, a carrier transporting layer and a catalyst layer on each of a plurality of first conductive layers on an insulating substrate, and (B) forming a plurality of solar cells electrically connected in series by forming a second conductive layer which extends from above one photoelectric conversion device to a first conductive layer beneath an adjacent another photoelectric conversion device to contact the first conductive layer, and the fabrication method of the present invention is characterized in that the second conductive layer of one solar cell is formed so as to contact the photoelectric conversion device of an adjacent another solar cell.

Further, in this fabrication method, the step (B) may includes a step of forming the partial conductive layer constituting a part of the second conductive layer in a region between two device-forming regions on the insulating substrate prior to the step (A), and in this case, the photoelectric conversion device is formed so as to contact the partial conductive layer in the step (A).

Further, the fabrication method of the present invention may include a step of applying a material for forming an insulating layer to a region between two device-forming regions on the insulating substrate prior to the step (A), and the step (A) may include a step of applying a material for forming a porous semiconductor layer onto the first conductive layer and a step of firing the material for forming an insulating layer and the material for forming a porous semiconductor layer simultaneously.

Further, an insulating substrate having a plurality of first conductive layers discretely formed on its surface may be used in the step (A), or a step of removing a part of the partial conductive layer and a part of the first conductive layer at the same location may be added prior to the step (A).

Hereinafter, specific steps of preparing the dye-sensitized solar cell module of the present invention will be described by way of Examples.

EXAMPLES

Example 1

In Example 1, the dye-sensitized solar cell module having the structure of Embodiment 1 (FIG. 1) was prepared according to the following procedure.

First, a glass substrate with a conductive layer (produced by Nippon Sheet Glass Co., Ltd, trade name: glass with $SnO_2$ film) in which a first conductive layer 2 made of a $SnO_2$ film is formed on an insulating substrate 1 made of glass was used, and scribe lines with a line width of 0.5 mm were formed by irradiating laser light to a predetermined location in the first conductive layer 2 of the glass substrate with a conductive layer with a laser scribing apparatus (manufactured by SEISHIN TRADING Co., Ltd.), in which a YAG laser (basic wavelength 1.06 μm) is mounted, to evaporate the $SnO_2$ film (FIG. 4(a)).

Subsequently, a glass paste (produced by Noritake Co, Ltd., trade name: Glass Paste) was applied to a predetermined location in each first conductive layer 2 with a screen-printing machine (LS-150 manufactured by NEWLONG SEIMITSU KOGYO Co., Ltd.), and the applied glass paste was dried at 100° C. for 15 minutes and then fired at 500° C. for 60 minutes in a firing furnace, and thereby a priming layer 6B of a second conductive layer having a film thickness of 30 μm was formed. Thereon, titanium was deposited by vapor deposition at a deposition rate of 0.02 nm/sec with a vapor deposition machine (EVD 500A manufactured by ANELVA Corp.) to form an amorphous partial conductive layer 6A having a film thickness of 300 nm of the first conductive layer (FIG. 4(b)). In addition, when a closely packed film was formed so that migration of a carrier transporting material can be blocked by only the partial conductive layer 6A, a portion of the priming layer can be a partial conductive layer.

Next, commercially available titanium oxide paste (produced by Solaronix S.A., trade name: Ti-Nanoxide T/SP) was applied to a predetermined location in each first conductive layer 2 with a screen-printing machine (LS-150 manufactured by NEWLONG SEIMITSU KOGYO Co., Ltd.), and the applied paste was fired at 500° C. for 40 minutes in air using a firing furnace (KDFP-100 manufactured by DENKEN Co., Ltd.) to form a porous semiconductor layer composed of a titanium oxide layer having a film thickness of 8 μm. Furthermore, onto this titanium oxide layer, commercially available titanium oxide paste (produced by Solaronix S.A., trade name: Ti-Nanoxide D/SP) was applied with a screen-printing machine (LS-150 manufactured by NEWLONG SEIMITSU KOGYO Co., Ltd.), and a process step, in which the applied paste was fired at 500° C. for 40 minutes in air using a firing furnace, was repeated three times to form a titanium oxide layer having a film thickness of 10 μm, and consequently a porous semiconductor layer 3a having an ultimate total film thickness of 18 μm was formed (FIG. 5(a)).

Next, onto this porous semiconductor layer 3a, a zirconium oxide paste prepared by using zirconium oxide particles having an average primary particle diameter of 50 nm was applied with a screen-printing machine (LS-150 manufactured by NEWLONG SEIMITSU KOGYO Co., Ltd.), and the applied paste was fired at 500° C. for 40 minutes in air using a firing furnace to form a porous insulating layer 4a having a film thickness of 5 μm (FIG. 5(b)).

Figure 6A:
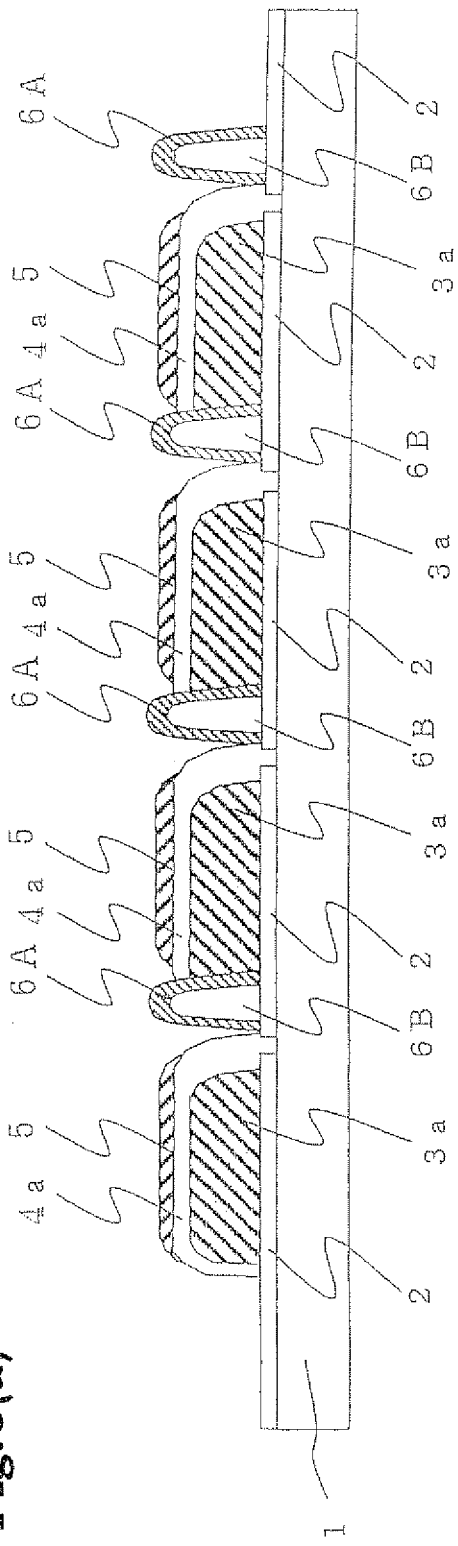
FIG. 6 is a schematic sectional view showing a step of preparation following that in FIG. 5.

Next, platinum was deposited by vapor deposition at a deposition rate of 0.1 nm/sec with a vapor deposition machine (EVD 500A manufactured by ANELVA Corp.) to form a catalyst layer 5 having a film thickness of 50 nm (FIG. 6(a)). Furthermore, titanium was deposited on the catalyst layer 5 by vapor deposition at a deposition rate of 0.02 nm/sec to form another partial conductive layer 6C having a film thickness of 300 nm of the second conductive layer, and thereby an ultimate second conductive layer 6 was formed (FIG. 6(b)).

Figure 6B:
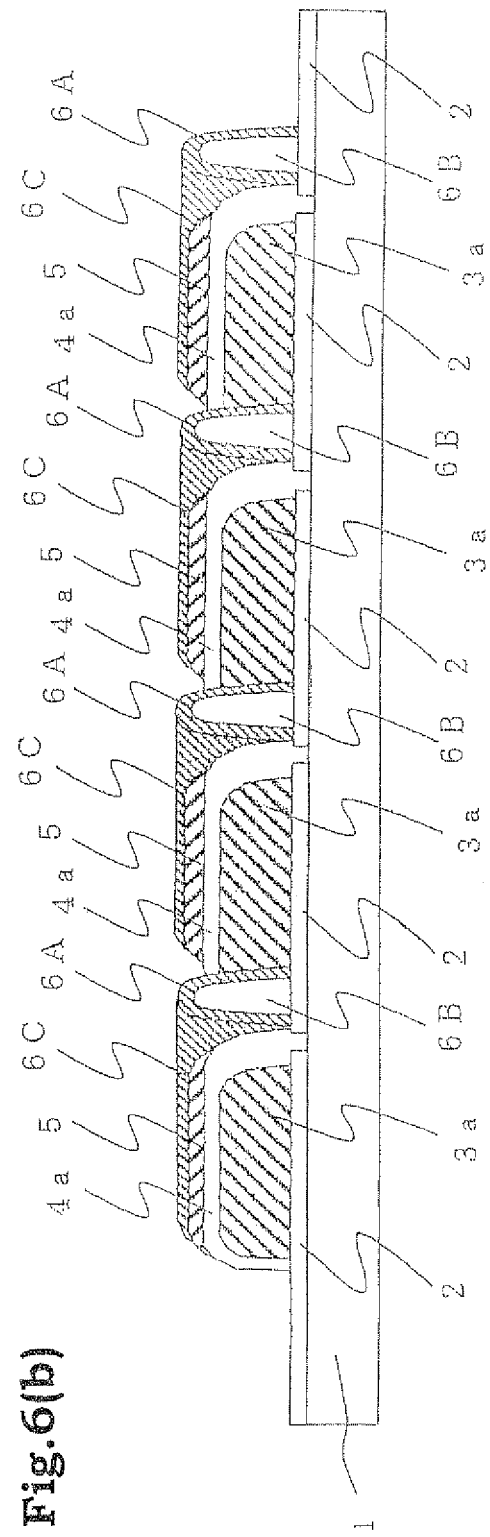

A laminated body (FIG. 6(b)) formed as described above was immersed in a solution of dye for adsorption prepared by dissolving a dye (produced by Solaronix S.A., trade name: Ruthenium620) of the above equation (3) in a concentration of $3 \times 10^{-4}$ mmol/liter in a mixed solvent of acetonitrile and n-butanol in proportions by volume of 1:1, and left standing at room temperature for 24 hours. Thereby, the dye was adsorbed on the porous semiconductor layer 3a to prepare a photoelectric conversion layer 3 (refer to FIG. 1). Thereafter, the laminated body was cleaned with ethanol and dried at about 60° C. for about 2 minutes.

Next, an ultraviolet curable resin (31X-101 produced by ThreeBond Co., Ltd.) was applied to a whole area of a PET plate (plate thickness 0.5 mm) as a cover film 8 (refer to FIG. 1) provided with a port for filling a carrier transporting material with a screen-printing machine (LS-150 manufactured by NEWLONG SEIMITSU KOGYO Co., Ltd.), and the PET plate was bonded so that the second conductive layer 6 of the laminated body contacts the ultraviolet curable resin, and the resin was cured by irradiating ultraviolet light with an ultraviolet lamp (manufactured by SEN LIGHTS Corp., HR 10001N-4) (refer to FIG. 1).

Thereafter, the following carrier transporting material was filled in the port (not shown) for filling a carrier transporting material by capillary action to impregnate the porous insulating layer 4a with the carrier transporting material, and then the port for filling a carrier transporting material was sealed to obtain a dye-sensitized solar cell module having a structure shown in FIG. 1.

A carrier transporting material was prepared by dissolving lithium iodide (LiI) with a concentration of 0.1 mol/l (produced by Aldrich Chemical Company), iodine ($I_2$) with a concentration of 0.05 mol/l (produced by Aldrich Chemical Company), TBP with a concentration of 0.5 mol/l (produced by Aldrich Chemical Company), and DMPII with a concentration of 0.6 mol/l (produced by SHIKOKU CHEMICALS Corp.) in acetonitrile (produced by Aldrich Chemical Company).

Figure 7:
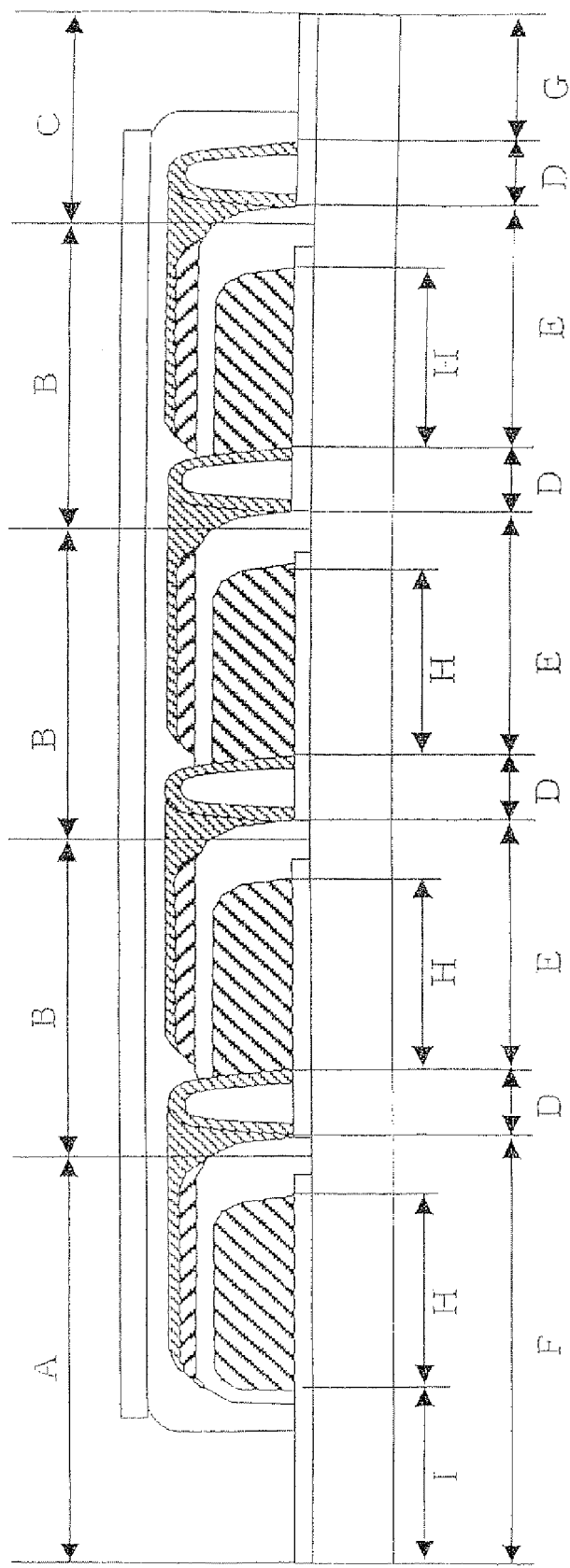
FIG. 7 is a schematic sectional view showing width dimensions of the respective constituent elements of the dye-sensitized solar cell module of Example 1.

In the dye-sensitized solar cell module of Example 1 thus formed in series of four photoelectric conversion devices, the photoelectric conversion layer was formed in a size of 5 mm×50 mm, and width dimensions of the respective constituent elements will be specifically described referring to FIG. 7 corresponding to FIG. 1. A dimension A is 35.75 mm, B is 7 mm, C is 31.25 mm, D is 1 mm, E is 6 mm, F is 36 mm, G is 30 mm, H is 5 mm, and I is 30 mm.

A black mask with an opening having a size of 26 mm×50 mm (an area of 13 $cm^2$) was placed on the insulating substrate, which is a light receiving plane, of this dye-sensitized solar cell module, and light with intensity of 1 $kW/m^2$ was irradiated to the black mask with an AM 1.5 Solar Simulator to measure a short circuit current, an open circuit voltage, a fill factor (FF) and photoelectric conversion efficiency. As a result, a short circuit current value was 38.5 mA, an open circuit voltage was 2.7 V, an FF was 0.61, and photoelectric conversion efficiency was 4.88%. Further, a ratio of a cell power generating area (an area of the photoelectric conversion layer) to a light receiving plane at the time of viewing the light receiving plane of the solar cell module from a vertical direction was measured to find to be 76.92%.

Example 2

In Example 2, the dye-sensitized solar cell module having the structure of Embodiment 2 (FIG. 2) was prepared according to the following procedure.

First, a glass substrate with a conductive layer (produced by Nippon Sheet Glass Co., Ltd, trade name: glass with $SnO_2$ film), in which a first conductive layer 22 made of a $SnO_2$ film is formed on an insulating substrate 21 made of glass, was used, and scribe lines with a line width of 0.5 mm were formed by irradiating laser light to a predetermined location in the first conductive layer 22 of the glass substrate with a conductive layer with a laser scribing apparatus (manufactured by SEISHIN TRADING Co., Ltd.), in which a YAG laser (basic wavelength 1.06 μm) is mounted, to evaporate the $SnO_2$ film (FIG. 8(a)).

Next, a glass paste (produced by Noritake Co., Ltd., trade name: Glass Paste) was applied onto an area between two adjacent first conductive layers 22 with a screen-printing machine (LS-150 manufactured by NEWLONG SEIMITSU KOGYO Co., Ltd.), and the applied glass paste was dried at 100° C. for 15 minutes and then fired at 500° C. for 60 minutes in a firing furnace to form an insulating layer 29 having a film thickness of 30 μm (FIG. 8(b))

Figure 9A:
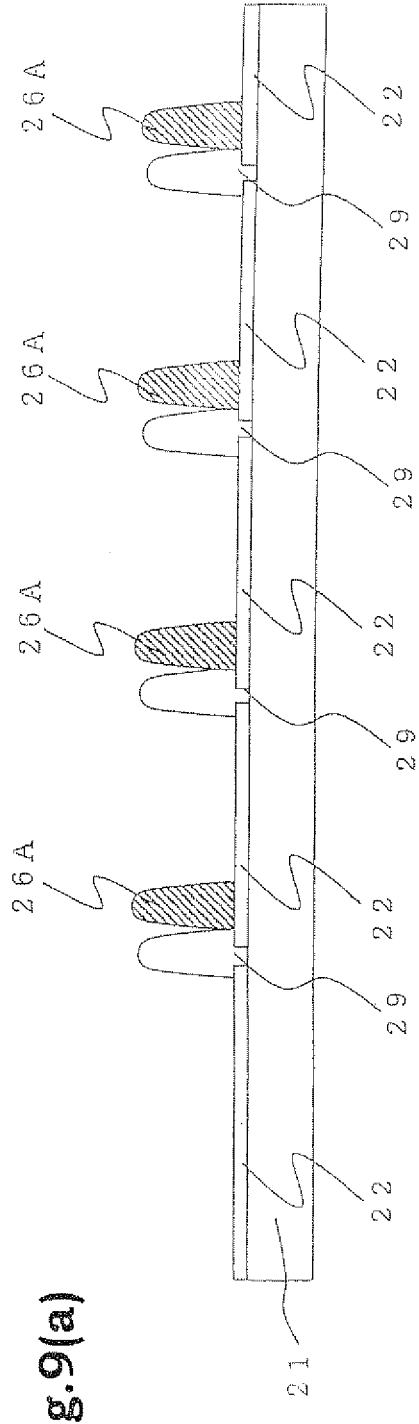
FIG. 9 is a schematic sectional view showing a step of preparation following that in FIG. 8.

Next, titanium was deposited in the vicinity of the insulating layer 29 on the first conductive layer 22 by vapor deposition at a deposition rate of 1.5 nm/sec with a vapor deposition machine (EVD 500A manufactured by ANELVA Corp.) to form a partial conductive layer 26A having a film thickness of 25 μm of the second conductive layer (FIG. 9(a)).

Figure 9B:
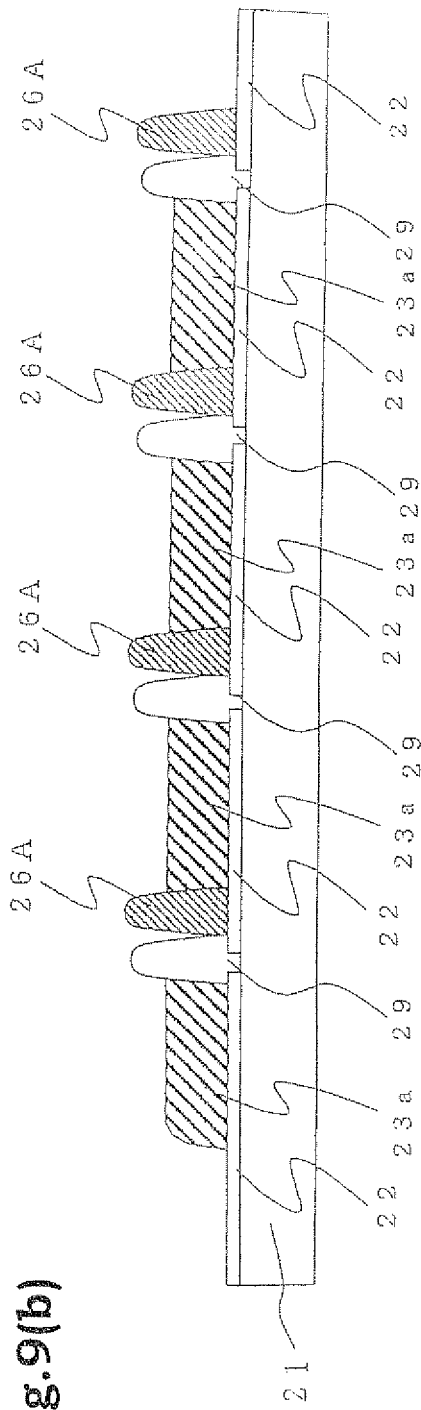
Figure 11:
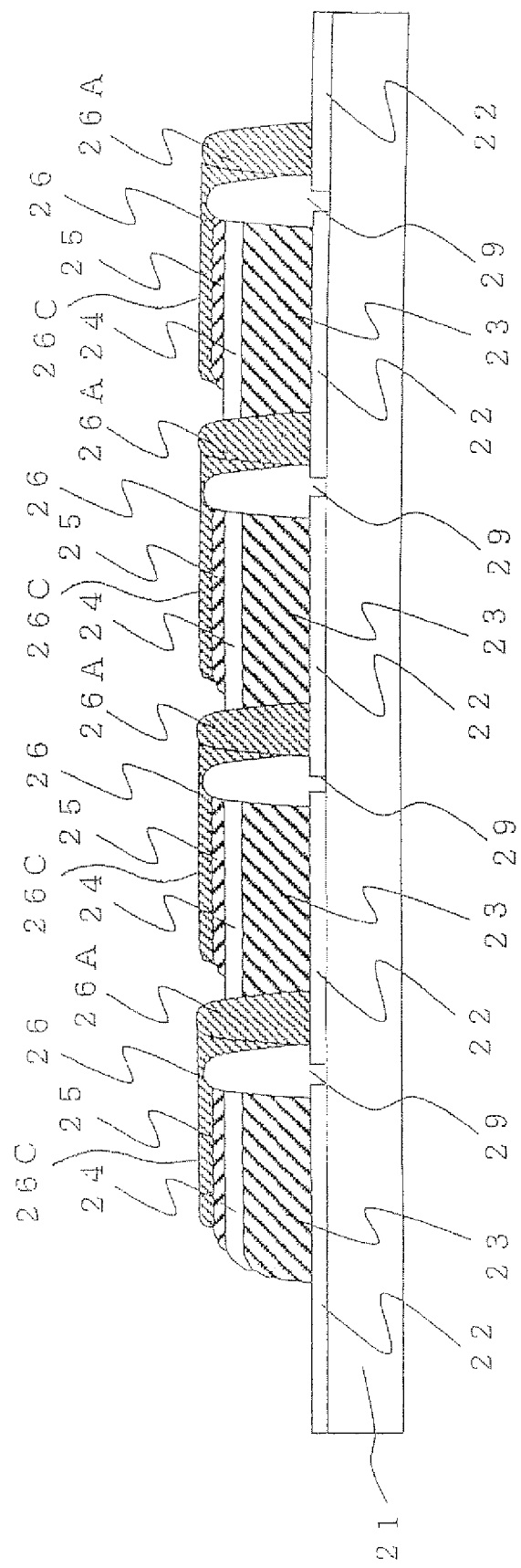
FIG. 11 is a schematic sectional view showing a step of preparation following that in FIG. 10.

Thereafter, an ultimate second conductive layer 26 was formed by forming a porous semiconductor layer 23a (FIG. 9(b)), a porous insulating layer 24a (FIG. 10(a)) and a catalyst layer 25 (FIG. 10(b)) as with Example 1 and forming another partial conductive layer 26C (FIG. 11), and a dye was adsorbed on the porous semiconductor layer 23a, the respective layers were sealed with a sealing layer 27 and a cover film 28 as shown in FIG. 2, and the porous insulating layer 24a was impregnated with a carrier transporting material to obtain a dye-sensitized solar cell module.

Figure 12:
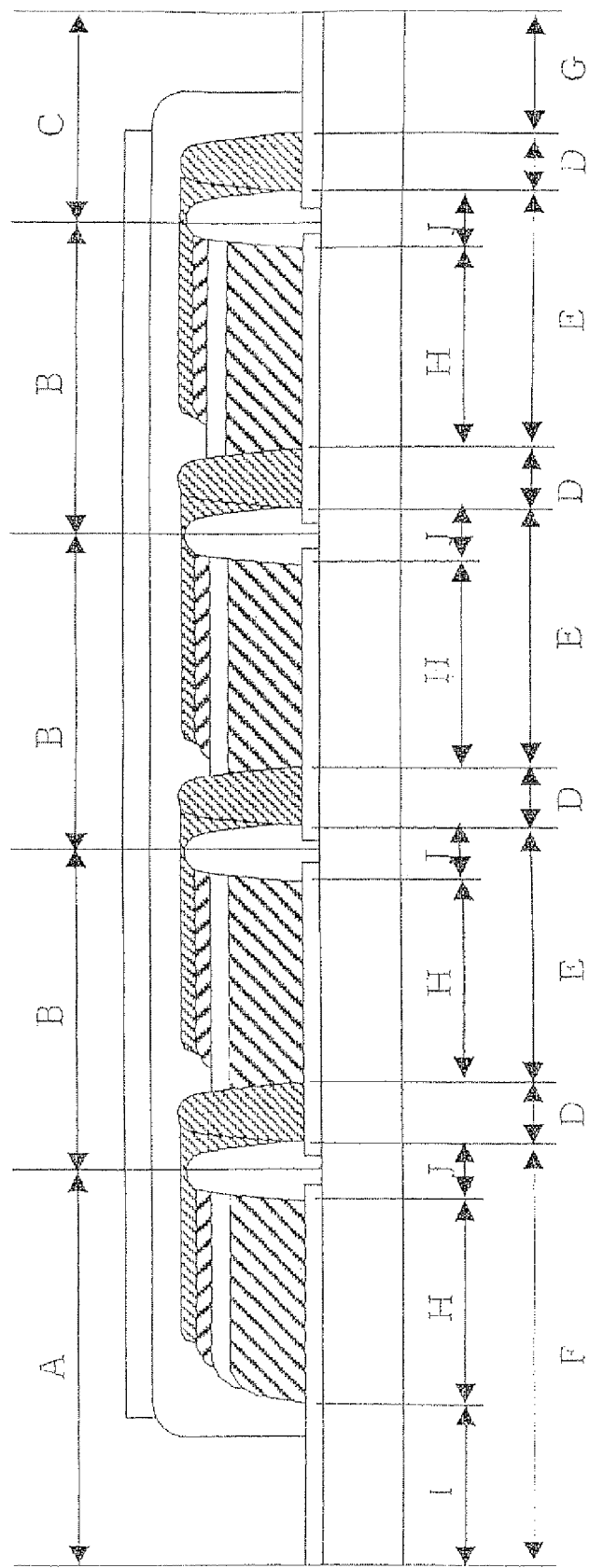
FIG. 12 is a schematic sectional view showing width dimensions of the respective constituent elements of the dye-sensitized solar cell module of Example 2.

In the dye-sensitized solar cell module of Example 2 thus formed in series of four photoelectric conversion devices, the photoelectric conversion layer was formed in a size of 5 mm×50 mm, and width dimensions of the respective constituent elements will be specifically described referring to FIG. 12 corresponding to FIG. 2. A dimension A is 35.5 mm, B is 7 mm, C is 31.5 mm, D is 1 mm, E is 6 mm, F is 36 mm, G is 30 mm, H is 5 mm, and I is 30 mm.

A black mask with an opening having a size of 26 mm×50 mm (an area of 13 $cm^2$) was placed on the insulating substrate, which is a light receiving plane, of this dye-sensitized solar cell module, and light with intensity of 1 $kW/m^2$ was irradiated to the black mask with an AM 1.5 Solar Simulator to measure a short circuit current, an open circuit voltage, a fill factor (FF) and photoelectric conversion efficiency. As a result, a short circuit current value was 40.3 mA, an open circuit voltage was 2.716 V, an FF was 0.595, and photoelectric conversion efficiency was 4.97%. Further, a ratio of a cell power generating area (an area of the photoelectric conversion layer) to a light receiving plane at the time of viewing the light receiving plane of the solar cell module from a vertical direction was measured to find to be 76.92%.

Example 3

In Example 3, the dye-sensitized solar cell module having the structure of Embodiment 3 (FIG. 3) was prepared according to the following procedure.

First, a glass substrate with a conductive layer (produced by Nippon Sheet Glass Co., Ltd, trade name: glass with $SnO_2$ film), in which a first conductive layer 32 made of a $SnO_2$ film is formed on an insulating substrate 31 made of glass, was used, and a glass paste (produced by Noritake Co., Ltd., trade name: Glass Paste) was applied to a predetermined location in the first conductive layer 32 of the glass substrate with a conductive layer with a screen-printing machine (LS-150 manufactured by NEWLONG SEIMITSU KOGYO Co., Ltd.), and the applied glass paste was dried at 100° C. for 15 minutes and then fired at 500° C. for 60 minutes in a firing furnace to form an insulating layer 39 having a film thickness of 30 μm (FIG. 13(a)).

Figure 13A:
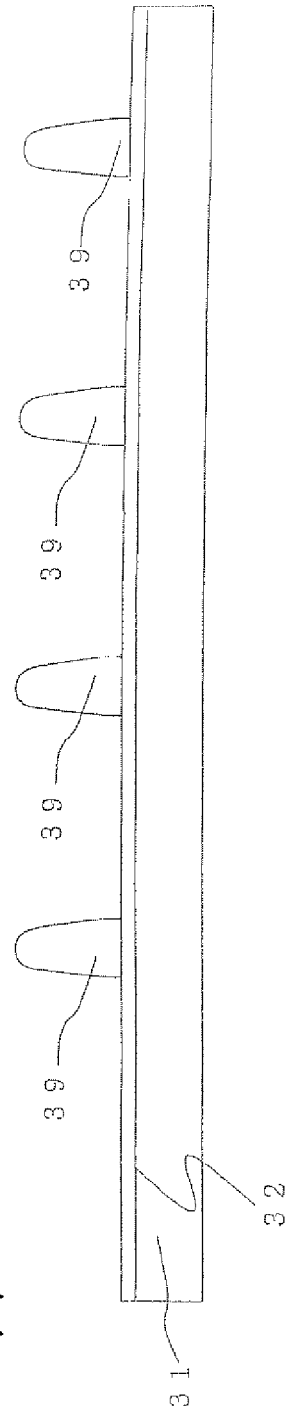
FIG. 13 is a schematic sectional view showing a step of preparing a dye-sensitized solar cell module of Example 3.
Figure 13B:
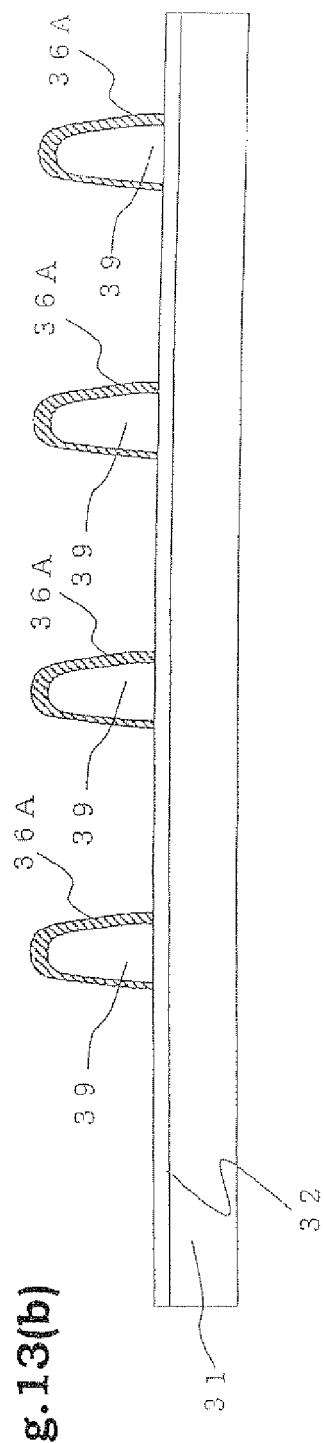

Thereafter, titanium was deposited on the insulating layer 39 by vapor deposition so as to contact the first conductive layer 32 in at least an adjacent device-forming region (right side in FIG. 13(a)) of the insulating layer 39 at a deposition rate of 0.5 nm/sec with a vapor deposition machine (EVD 500A manufactured by ANELVA Corp.) to form a partial conductive layer 36A having a film thickness of 300 nm of the second conductive layer (FIG. 13(b)).

Figure 13C:
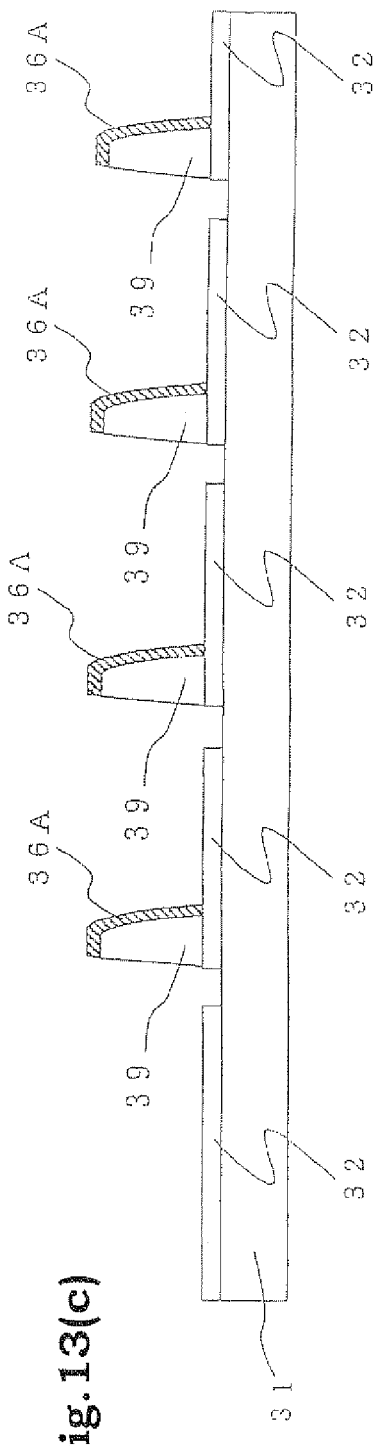

Next, scribe lines with a line width of 0.5 mm were formed by irradiating laser light to a left side portion of the insulating layer 39 in FIG. 13(b) so as to remove the portion with a laser scribing apparatus (manufactured by SEISHIN TRADING Co., Ltd.), in which a YAG laser (basic wavelength 1.06 μm) is mounted, to partially evaporate the partial conductive layer 36A, the insulating layer 39 and the first conductive layer 32 (FIG. 13(c)).

Thereafter, an ultimate second conductive layer 36 was formed by forming a porous semiconductor layer 33a (FIG. 14(a)), a porous insulating layer 34a (FIG. 14(b)) and a catalyst layer 35 (FIG. 15(a)) as with Example 1 and forming another partial conductive layer 36C (FIG. 15(b)), and a dye was adsorbed on the porous semiconductor layer 33a, the respective layers were sealed with a sealing layer 37 and a cover film 38 as shown in FIG. 3, and the porous insulating layer 34a was impregnated with a carrier transporting material to obtain a dye-sensitized solar cell module.

Figure 16:
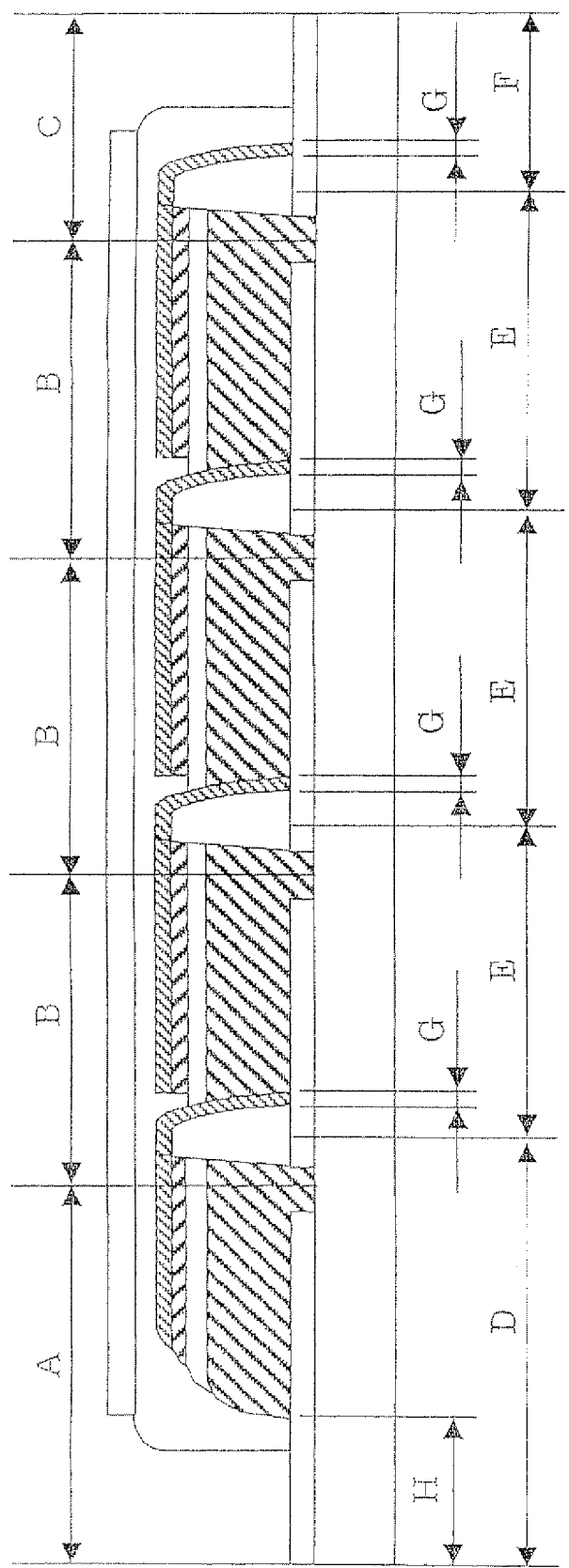
FIG. 16 is a schematic sectional view showing width dimensions of the respective constituent elements of the dye-sensitized solar cell module of Example 3.

In the dye-sensitized solar cell module of Example 3 thus formed in series of four photoelectric conversion devices, the photoelectric conversion layer was formed in a size of 5 mm×50 mm, and width dimensions of the respective constituent elements will be specifically described referring to FIG. 16 corresponding to FIG. 3. A dimension A is 35 mm, B is 5.751 mm, C is 30.001 mm, D is 35.5 mm, E is 5.751 mm, F is 30.501 mm, G is 0.001 mm, and H is 30 mm.

A black mask with an opening having a size of 22.5 mm×50 mm (an area of 11.25 $cm^2$) was placed on the insulating substrate, which is a light receiving plane, of this dye-sensitized solar cell module, and light with intensity of 1 $kW/m^2$ was irradiated to the black mask with an AM 1.5 Solar Simulator to measure a short circuit current, an open circuit voltage, a fill factor (FF) and photoelectric conversion efficiency. As a result, a short circuit current value was 39.9 mA, an open circuit voltage was 2.712 V, an FF was 0.62, and photoelectric conversion efficiency was 5.96%. Further, a ratio of a cell power generating area (an area of the photoelectric conversion layer) to a light receiving plane at the time of viewing the light receiving plane of the solar cell module from a vertical direction was measured to find to be 88.88%.

Example 4

In Example 4, a dye-sensitized solar cell module was prepared in the same manner as in Example 2 except that the following procedures are different from those in Example 2.

That is, in Example 4, the solar cell module was prepared in the same manner as in Example 2 except that after a glass paste, a material for forming an insulating layer, was applied and the applied glass paste was dried at 100° C. for 15 minutes, a second conductive layer was formed, and titanium oxide paste, a material for forming a porous semiconductor layer, was applied and dried, and then the glass paste and the titanium oxide paste were simultaneously fired to form an insulating layer and a porous semiconductor layer.

In the dye-sensitized solar cell module of Example 4 thus formed in series of four photoelectric conversion devices, the photoelectric conversion layer was formed in a size of 5 mm×50 mm, and width dimensions of the respective constituent elements will be specifically described referring to FIG. 12 corresponding to FIG. 2. A dimension A is 35.5 mm, B is 7 mm, C is 31.5 mm, D is 1 mm, E is 6 mm, F is 36 mm, G is 30 mm, H is 5 mm, I is 30 mm, and J is 1 mm.

A black mask with an opening having a size of 26 mm×50 mm (an area of 13 $cm^2$) was placed on the insulating substrate, which is a light receiving plane, of this dye-sensitized solar cell module, and light with intensity of 1 $kW/m^2$ was irradiated to the black mask with an AM 1.5 Solar Simulator to measure a short circuit current, an open circuit voltage, a fill factor (FF) and photoelectric conversion efficiency. As a result, a short circuit current value was 40.6 mA, an open circuit voltage was 2.710 V, an FF was 0.600, and photoelectric conversion efficiency was 5.08%. Further, a ratio of a cell power generating area (an area of the photoelectric conversion layer) to a light receiving plane at the time of viewing the light receiving plane of the solar cell module from a vertical direction was measured to find to be 76.92%.

Comparative Example

Figure 17:
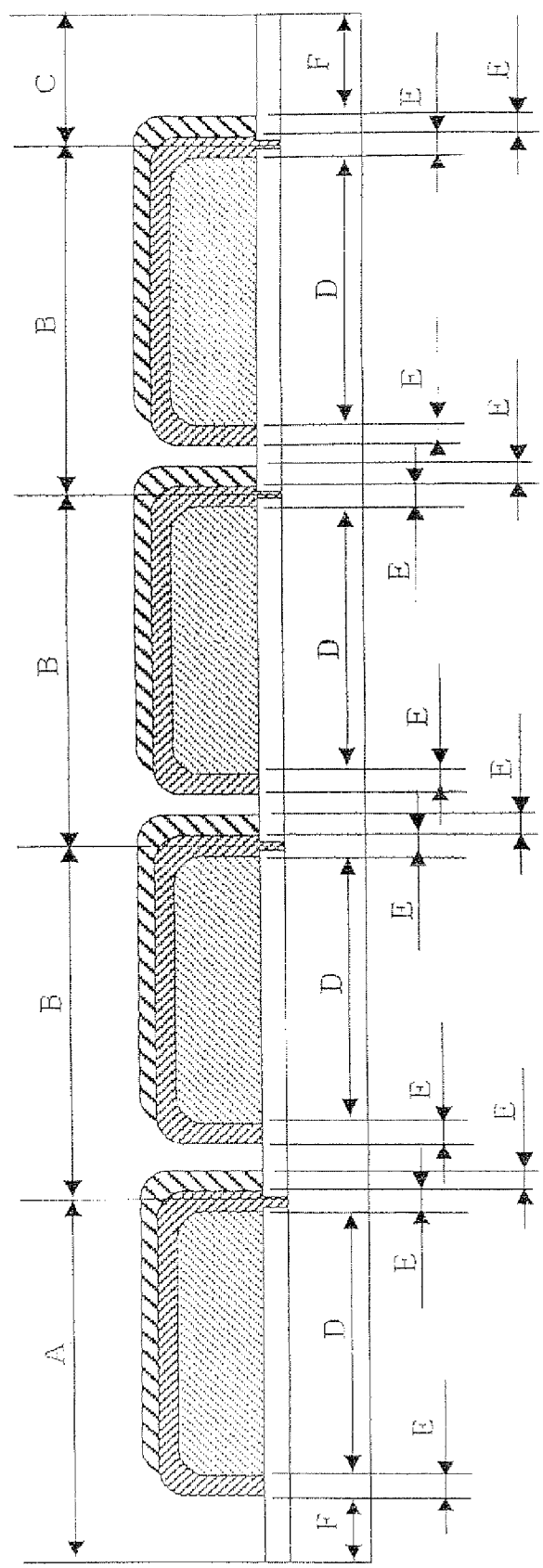
FIG. 17 is a schematic sectional view showing width dimensions of the respective constituent elements of a dye-sensitized solar cell module of Comparative Example.
Figure 18:
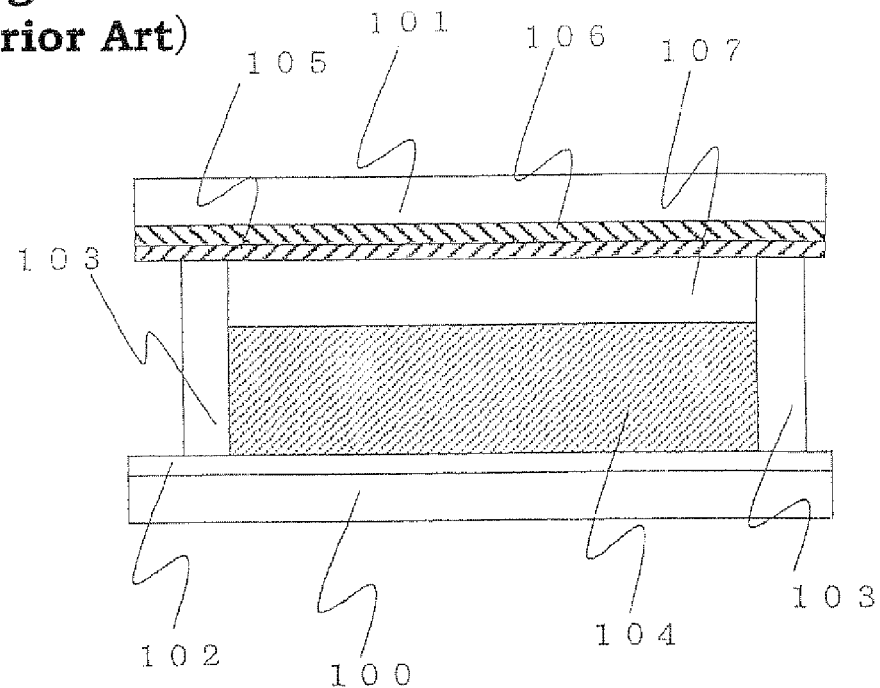
FIG. 18 is a schematic sectional view showing a constitution of a dye-sensitized solar cell module of a conventional technology 1.
Figure 19:
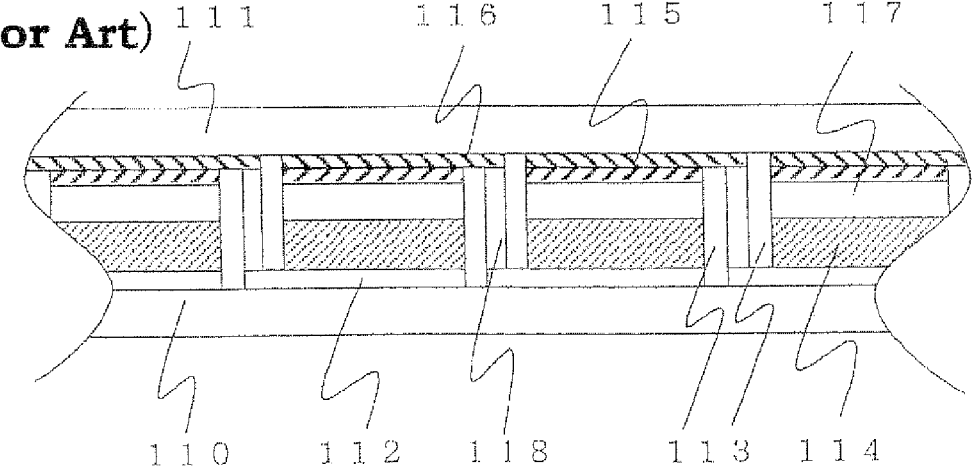
FIG. 19 is a schematic sectional view showing a constitution of a dye-sensitized solar cell module of a conventional technology 2.
Figure 20:
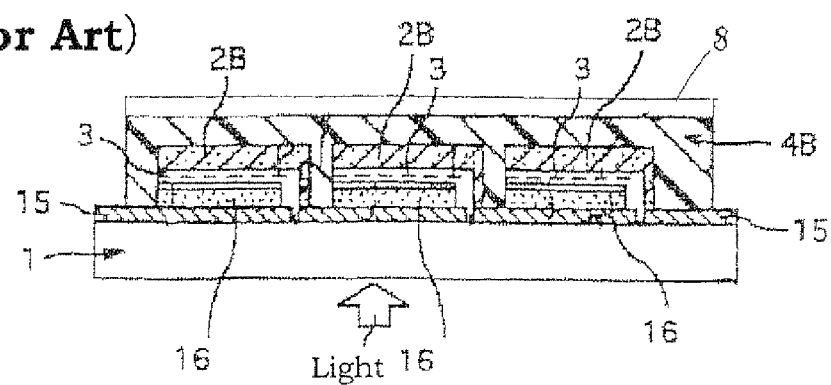
FIG. 20 is a schematic sectional view showing a constitution of a dye-sensitized solar cell module of a conventional technology 3
Figure 21:
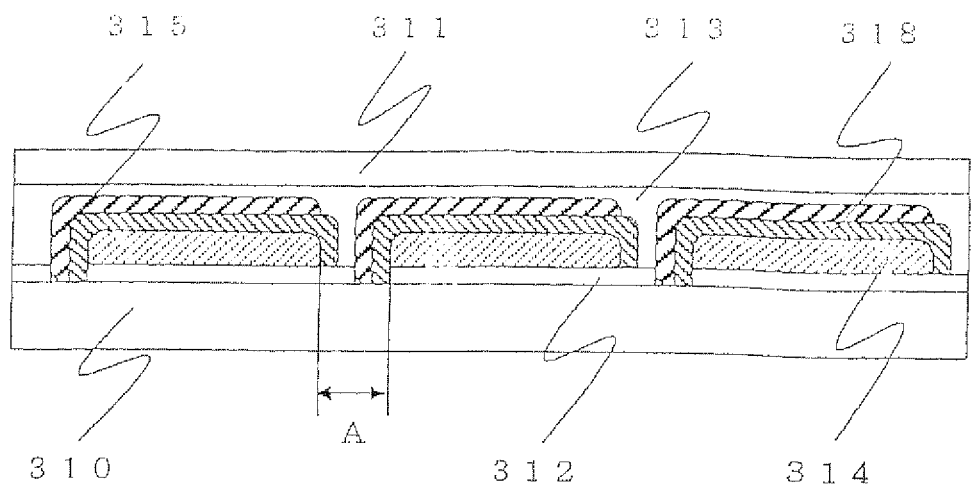
FIG. 21 is a schematic sectional view showing a constitution of a dye-sensitized solar cell module of a conventional technology 4.

As Comparative Example, the dye-sensitized solar cell module, in which four photoelectric conversion devices are in series, shown in FIG. 17 corresponding to FIG. 21 showing a conventional technology 4 was prepared. A basic preparation method and materials used are similar to those of Example 1.

In the dye-sensitized solar cell module of Comparative Example thus formed, the photoelectric conversion layer was formed in a size of 5 mm×50 mm, and width dimensions of the respective constituent elements will be specifically described referring to FIG. 17 corresponding to FIG. 21. A dimension A is 36.5 mm, B is 9 mm, C is 31.5 mm, D is 5 mm, E is 1 mm, and F is 30 mm.

A black mask with an opening having a size of 32 mm×50 mm (an area of 16 $cm^2$) was placed on the insulating substrate, which is a light receiving plane, of this dye-sensitized solar cell module, and light with intensity of 1 $kW/m^2$ was irradiated to the black mask with an AM 1.5 Solar Simulator to measure a short circuit current, an open circuit voltage, a fill factor (FF) and photoelectric conversion efficiency. As a result, a short circuit current value was 38.0 mA, an open circuit voltage was 2.708 V, an FF was 0.57, and photoelectric conversion efficiency was 3.67%. Further, a ratio of a cell power generating area (an area of the photoelectric conversion layer) to a light receiving plane at the time of viewing the light receiving plane of the solar cell module from a vertical direction was measured to find to be 62.5%.

From the obtained results, it was found that dye-sensitized solar cell modules in Examples 1 to 4 had higher conversion efficiency than that in Comparative Example. It is thought that outputs obtained from solar cells in the dye-sensitized solar cell module in Examples are basically similar to that in Comparative Example but the conversion efficiency of Examples becomes higher than that of Comparative Example since solar cell modules in Examples have a larger area ratio of a power generating area to a light receiving plane of the solar cell module than that in Comparative Example. Further, it was found that the solar cell module in Example 3, in which an area ratio of a power generating area is largest, exhibits highest conversion efficiency among the solar cell modules in Examples 1 to 4.

The invention claimed is:

1. A dye-sensitized solar cell module comprising:
a plurality of electrically series-connected solar cells each having a first conductive layer formed on an insulating substrate, a photoelectric conversion device formed on the first conductive layer, and a second conductive layer formed over the photoelectric conversion device,
wherein the photoelectric conversion device includes a photoelectric conversion layer, a carrier transporting layer and a catalyst layer, the photoelectric conversion layer comprising a porous semiconductor adsorbing a dye, and wherein the second conductive layer formed over the photoelectric conversion device of the above-described one solar cell contacts the first conductive layer of an adjacent another solar cell and the photoelectric conversion layer of the above-described adjacent another solar cell is in direct physical contact with the second conductive layer formed over the above-described one solar cell, wherein the carrier transporting layer of one solar cell is separated from the carrier transporting layer of an adjacent another solar cell by the intervening second conductive layer to prevent the carrier transporting layers from coming in contact with each other.

2. A dye-sensitized solar cell module of claim 1, wherein the second conductive layer is composed of two or more materials.

3. A dye-sensitized solar cell module of claim 2, wherein the second conductive layer comprises two or more materials selected from the group consisting of an inorganic material and a resin material.

4. A dye-sensitized solar cell module of claim 2, wherein the second conductive layer is composed of two or more layers.

5. A dye-sensitized solar cell module of claim 1, wherein a material of the second conductive layer is titanium, tantalum or nickel, or an alloy containing at least one metal of titanium, tantalum and nickel.

6. A dye-sensitized solar cell module of claim 1, wherein an insulating layer is formed between the photoelectric conversion device and the second conductive layer in each solar cell.

7. A dye-sensitized solar cell module of claim 6, wherein the insulating layer is made from an inorganic material.

8. A dye-sensitized solar cell module of claim 6, wherein the insulating layer contacts the photoelectric conversion layer.

* * * * *